(12) United States Patent
Hirao

(10) Patent No.: US 6,549,665 B1
(45) Date of Patent: Apr. 15, 2003

(54) IMAGE SIGNAL PROCESSING DEVICE

(75) Inventor: Kouichiro Hirao, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/426,714

(22) Filed: Oct. 26, 1999

(30) Foreign Application Priority Data

Oct. 26, 1998 (JP) .......................................... 10-304628

(51) Int. Cl.⁷ ................................................. G06K 9/36
(52) U.S. Cl. ...................... 382/232; 382/236; 382/238; 382/247
(58) Field of Search ................................ 382/166, 232, 382/236, 238, 247

(56) References Cited

U.S. PATENT DOCUMENTS

| | | | | |
|---|---|---|---|---|
| 5,317,411 A | * | 5/1994 | Yoshida ...................... | 382/232 |
| 5,418,863 A | | 5/1995 | Ando .......................... | 382/56 |
| 5,710,826 A | * | 1/1998 | Osawa et al. ................ | 382/166 |
| 5,784,497 A | | 7/1998 | Ishizuka et al. ............. | 382/247 |

FOREIGN PATENT DOCUMENTS

| | | | | |
|---|---|---|---|---|
| JP | 6-121172 | 4/1994 | ........... | H04N/1/411 |
| JP | 6-225158 | 8/1994 | ........... | H04N/1/411 |
| JP | 8-154059 | 6/1996 | ............. | H03M/7/40 |

* cited by examiner

*Primary Examiner*—Anh Hong Do
(74) *Attorney, Agent, or Firm*—Foley & Lardner

(57) ABSTRACT

An image signal processing device enables renewal of probability presumption information to be processed in high speed using logical circuit. A transition state renewal part 101 implements maintenance/renewal of status ('ST') value corresponding to respective contexts ('CX') and more probability symbol ('MPS') value of the 'CX'. An 'A'-register operation part 102 implements subtraction between value of 'A'-register and occurrence probability ('LSZ') of low probability symbol ('LPS'), shift of the 'A'-register. A probability transition table 103 outputs corresponding 'LSZ', next objective of transition ('NMPS') in the case of 'MPS', next objective of transition ('NLPS') when 'PIX' is 'LPS', and value of occurrence of inversion of 'MPS' value ('SWTCH') in answer to value of 'ST' inputted therein. An 'C'-register operation part 105 implements addition/subtraction between value of 'C'-register and value of 'A'-register and/or shift of the 'C'-register. Thus cycle of read and write of probability presumption information for generating timing of input/output of signal due to a 'CT' renewal part 106 is implemented in high speed, with the result that processing speed of the whole coding processing is improved.

15 Claims, 17 Drawing Sheets

F I G. 17
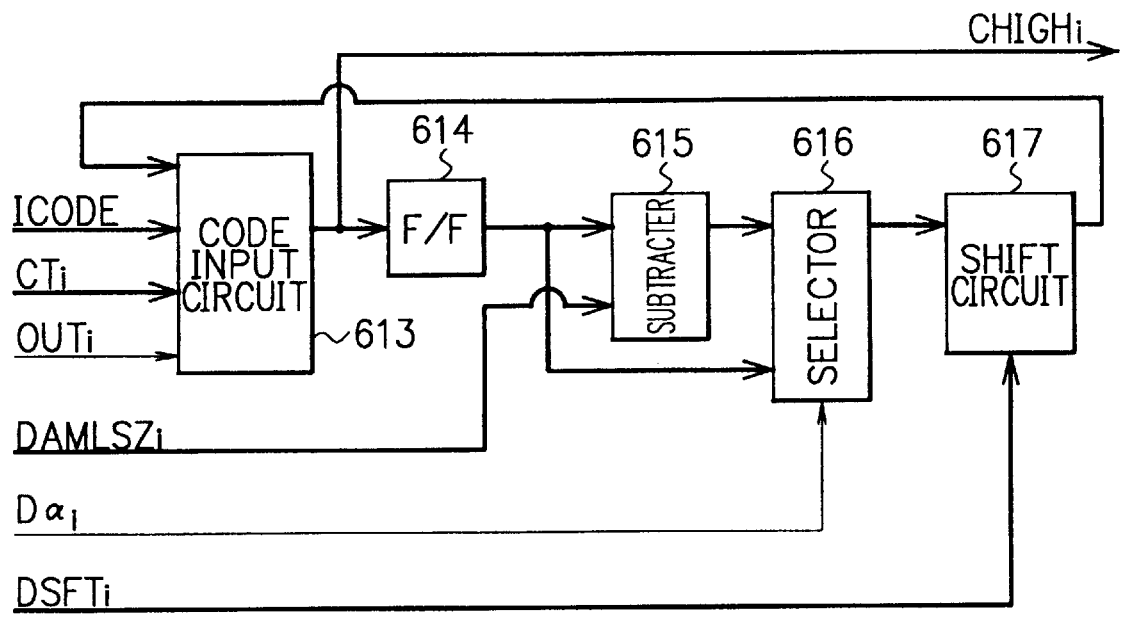
F I G. 18
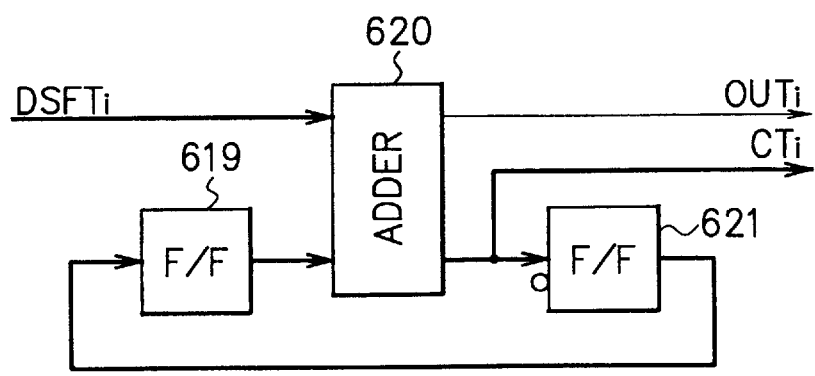

F I G. 19

| CI\CT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| CI31 | C31 | C31 | C31 | C31 | C31 | C31 | C31 | C31 | C31 | C31 | C31 | C31 | C31 | C31 | C31 | C31 |
| CI30 | I15 | C30 | C30 | C30 | C30 | C30 | C30 | C30 | C30 | C30 | C30 | C30 | C30 | C30 | C30 | C30 |
| CI29 | I14 | I15 | C29 | C29 | C29 | C29 | C29 | C29 | C29 | C29 | C29 | C29 | C29 | C29 | C29 | C29 |
| CI28 | I13 | I14 | I15 | C28 | C28 | C28 | C28 | C28 | C28 | C28 | C28 | C28 | C28 | C28 | C28 | C28 |
| CI27 | I12 | I13 | I14 | I15 | C27 | C27 | C27 | C27 | C27 | C27 | C27 | C27 | C27 | C27 | C27 | C27 |
| CI26 | I11 | I12 | I13 | I14 | I15 | C26 | C26 | C26 | C26 | C26 | C26 | C26 | C26 | C26 | C26 | C26 |
| CI25 | I10 | I11 | I12 | I13 | I14 | I15 | C25 | C25 | C25 | C25 | C25 | C25 | C25 | C25 | C25 | C25 |
| CI24 | I9 | I10 | I11 | I12 | I13 | I14 | I15 | C24 | C24 | C24 | C24 | C24 | C24 | C24 | C24 | C24 |
| CI23 | I8 | I9 | I10 | I11 | I12 | I13 | I14 | I15 | C23 | C23 | C23 | C23 | C23 | C23 | C23 | C23 |
| CI22 | I7 | I8 | I9 | I10 | I11 | I12 | I13 | I14 | I15 | C22 | C22 | C22 | C22 | C22 | C22 | C22 |
| CI21 | I6 | I7 | I8 | I9 | I10 | I11 | I12 | I13 | I14 | I15 | C21 | C21 | C21 | C21 | C21 | C21 |
| CI20 | I5 | I6 | I7 | I8 | I9 | I10 | I11 | I12 | I13 | I14 | I15 | C20 | C20 | C20 | C20 | C20 |
| CI19 | I4 | I5 | I6 | I7 | I8 | I9 | I10 | I11 | I12 | I13 | I14 | I15 | C19 | C19 | C19 | C19 |
| CI18 | I3 | I4 | I5 | I6 | I7 | I8 | I9 | I10 | I11 | I12 | I13 | I14 | I15 | C18 | C18 | C18 |
| CI17 | I2 | I3 | I4 | I5 | I6 | I7 | I8 | I9 | I10 | I11 | I12 | I13 | I14 | I15 | C17 | C17 |
| CI16 | I1 | I2 | I3 | I4 | I5 | I6 | I7 | I8 | I9 | I10 | I11 | I12 | I13 | I14 | I15 | C16 |
| CI15 | I0 | I1 | I2 | I3 | I4 | I5 | I6 | I7 | I8 | I9 | I10 | I11 | I12 | I13 | I14 | I15 |
| CI14 | 0 | I0 | I1 | I2 | I3 | I4 | I5 | I6 | I7 | I8 | I9 | I10 | I11 | I12 | I13 | I14 |
| CI13 | 0 | 0 | I0 | I1 | I2 | I3 | I4 | I5 | I6 | I7 | I8 | I9 | I10 | I11 | I12 | I13 |
| CI12 | 0 | 0 | 0 | I0 | I1 | I2 | I3 | I4 | I5 | I6 | I7 | I8 | I9 | I10 | I11 | I12 |
| CI11 | 0 | 0 | 0 | 0 | I0 | I1 | I2 | I3 | I4 | I5 | I6 | I7 | I8 | I9 | I10 | I11 |
| CI10 | 0 | 0 | 0 | 0 | 0 | I0 | I1 | I2 | I3 | I4 | I5 | I6 | I7 | I8 | I9 | I10 |
| CI9 | 0 | 0 | 0 | 0 | 0 | 0 | I0 | I1 | I2 | I3 | I4 | I5 | I6 | I7 | I8 | I9 |
| CI8 | 0 | 0 | 0 | 0 | 0 | 0 | 0 | I0 | I1 | I2 | I3 | I4 | I5 | I6 | I7 | I8 |
| CI7 | 0 | 0 | 0 | 0 | 0 | 0 | 0 | 0 | I0 | I1 | I2 | I3 | I4 | I5 | I6 | I7 |
| CI6 | 0 | 0 | 0 | 0 | 0 | 0 | 0 | 0 | 0 | I0 | I1 | I2 | I3 | I4 | I5 | I6 |
| CI5 | 0 | 0 | 0 | 0 | 0 | 0 | 0 | 0 | 0 | 0 | I0 | I1 | I2 | I3 | I4 | I5 |
| CI4 | 0 | 0 | 0 | 0 | 0 | 0 | 0 | 0 | 0 | 0 | 0 | I0 | I1 | I2 | I3 | I4 |
| CI3 | 0 | 0 | 0 | 0 | 0 | 0 | 0 | 0 | 0 | 0 | 0 | 0 | I0 | I1 | I2 | I3 |
| CI2 | 0 | 0 | 0 | 0 | 0 | 0 | 0 | 0 | 0 | 0 | 0 | 0 | 0 | I0 | I1 | I2 |
| CI1 | 0 | 0 | 0 | 0 | 0 | 0 | 0 | 0 | 0 | 0 | 0 | 0 | 0 | 0 | I0 | I1 |
| CI0 | 0 | 0 | 0 | 0 | 0 | 0 | 0 | 0 | 0 | 0 | 0 | 0 | 0 | 0 | 0 | I0 |

FIG. 20A

|   | 0 | 1 |
|---|---|---|
| α | A≤CHIGH | A>CHIGH |
| β | A<0x8000 | A≥0x8000 |
| γ | A<LSZ[ST[CX]] | A≥LSZ[ST[CX]] |

FIG. 20B

|   | MPS[CX] | 1−MPS[CX] |
|---|---|---|
| PIX DETERMINATION | α=γ | α≠γ |

FIG. 20C

|   | NO-INVERSION | INVERSION |
|---|---|---|
| MPS INVERSION | α=γ OR SWTCH[ST[CX]]=0 | α≠γ AND SWTCH[ST[CX]]=1 |

FIG. 20D

|   | NMPS[ST[CX]] | NLPS[ST[CX]] | ST[CX] |
|---|---|---|---|
| ST RENEWAL | β=0 AND α=γ | β=0 AND α≠γ | β=1 |

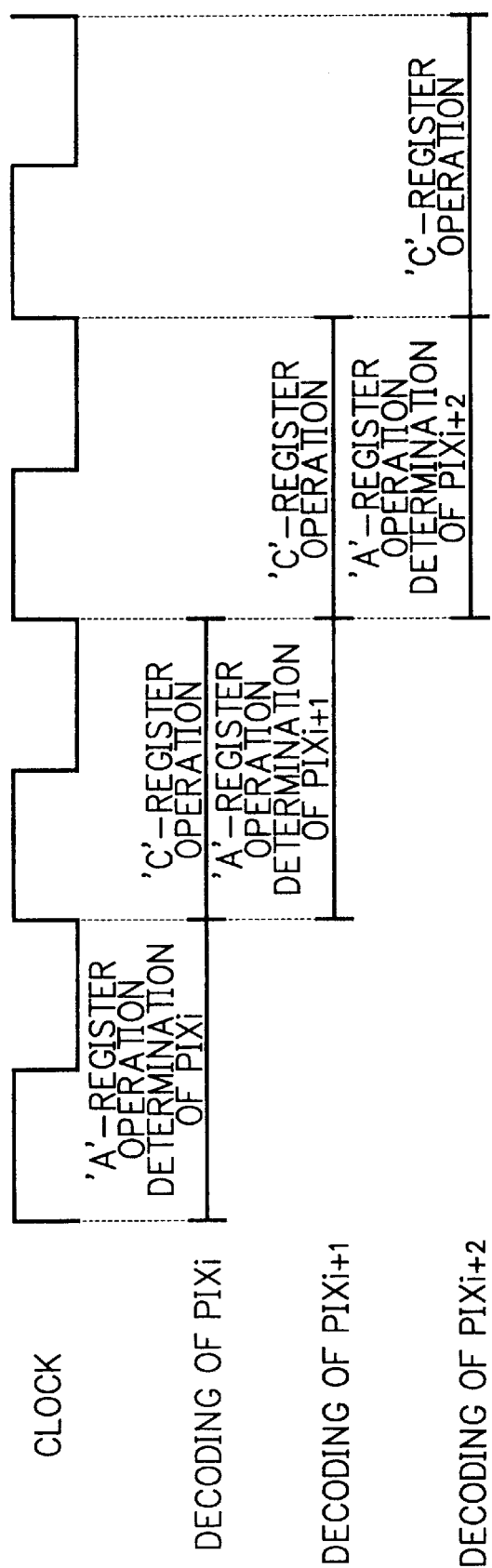

FIG. 22A

|   | 0 | 1 |
|---|---|---|
| α | PIX=MPS[ST[CX]] | PIX≠MPS[ST[CX]] |
| β | A<0x8000 | A≥0x8000 |
| γ | A<LSZ[ST[CX]] | A≥LSZ[ST[CX]] |

FIG. 22B

|   | NO-INVERSION | INVERSION |
|---|---|---|
| MPS INVERSION | α=1 OR SWTCH[ST[CX]]=0 | α=0 AND SWTCH[ST[CX]]=1 |

FIG. 22C

|   | NMPS[ST[CX]] | NLPS[ST[CX]] | ST[CX] |
|---|---|---|---|
| ST RENEWAL | β=0 AND α=1 | β=0 AND α=0 | β=1 |

IMAGE SIGNAL PROCESSING DEVICE

BACKGROUND OF THE INVENTION

The present invention relates to an image signal processing device. More particularly, this invention relates to an image signal processing device which implements coding/decoding in high speed in an arithmetic coding used under Recommendation T.82 and T.85 of ITU-T.

DESCRIPTION OF THE PRIOR ART

Formerly, in general, an image signal processing device is constituted as a device which works according to an arithmetic coding. In recent years, in the arithmetic coding, a coding system of static image in Recommendation T.82 and T.85 of ITU-T (International Telecommunication Union) is applied thereto to be used. This arithmetic coding system implements coding in such a way that the coding system predicts an occurrence pixel in every one pixel unit. In order to predict a pixel, a set of peripheral pixels called a model template is used as a reference pixel. Such a combination of the peripheral pixels is called a context. Each context represents status of the peripheral pixels. Thus, each context has a pixel value which is easy to occur or with an occurrence probability or so forth. The image signal processing device implements coding/decoding processing of the pixel while using this information.

FIG. 1 is a coding flowchart of an arithmetic coding. In FIG. 1, firstly, initialization of respective parameters is implemented (STEP S100), subsequently, read-in operation of a pixel to come to coding candidate (hereinafter referred to as 'PIX') and a context (hereinafter referred to as 'CX') corresponding to the 'PIX' are implemented (S101). Coding processing of 'PIX' is implemented using read-in 'PIX' and 'CX' (S102).

Above-described processing of STEP S101, and STEP S102 are continued up to end of stripe operation (S103). Here, the stripe is processing unit of coding. In general, the coding processing is performed while dividing one page of image into some stripes. When one stripe ends, 'FLUSH' processing is performed for expelling codes from inside of register and/or buffer (S104).

FIG. 2 is a detailed flowchart of 'coding processing' of STEP S102 of FIG. 1. In FIG. 2, 'PIX' is a present coding candidate pixel value, and 'MPS [CX]' is value of more probability symbol (in other word, superior probability symbol, hereinafter, referred to as 'MPS') of context 'CX' on that occasion. The present coding candidate pixel value 'PIX' is compared with the more probability symbol of context 'CX' on that occasion 'MPS[CX]' (STEP S200), before, discriminating whether the present coding candidate pixel value 'PIX' is more probability symbol 'MPS' (STEP S200/Yes) or the present coding candidate pixel value 'PIX' is less probability symbol (in other word, inferior probability symbol, hereinafter, referred to as LPS) (STEP S200/No).

When the present candidate pixel value 'PIX' is the less probability symbol 'LPS', subtraction is performed between value of 'A'-register which indicates a 'probability area width', and value of occurrence probability of the less probability symbol 'LPS' (hereinafter referred to as 'LSZ'), subsequently, result of the subtraction is substituted (STEP S201). Next, the value of the 'A'-register calculated earlier is compared with 'LSZ' (STEP S202). When the result of the comparison is 'A'≧'LSZ', addition is performed between value of 'C'-register to be an operation register and value of 'A'-register, subsequently, 'LSZ' is substituted into the 'A'-register (STEP S203).

When the result of the comparison of STEP S202 is 'A'<'LSZ', or 'A'≧'LSZ', after termination of STEP S203, value of 'SWTCH' is checked, in the case of 'SWTCH'=1, value of 'MPS' is inverted (STEP S204/Yes, STEP S205). When the 'SWTCH' is 'SWTCH'=0 (STEP S204/No), nothing is performed and going to next STEP S206.

Finally, 'NLPS[ST[CX]]' representing status of next objective of transition at the time of 'LPS' is substituted into value 'ST[CX]' of status (hereinafter, referred to as 'ST') representing probability transition state of 'CX'. Subsequently, normalization processing is implemented (STEP S206), to terminate coding processing of the 'PIX'.

A probability transition table is constituted by value of 'LSZ', 'NLPS' to be next objective of transition when 'PIX' is 'LPS', 'NMPS' to be next objective of transition in case of 'MPS', and 'SWTCH' representing occurrence of inversion of 'MPS' value, in every ST. Thus, probability-state transition in coding processing is implemented in accordance with the above described probability transition table.

When 'PIX' is judged to be 'MPS' in STEP S200, 'LSZ' is subtracted from value of 'A'-register in the same manner as the case of 'LPS' (STEP S207). The value of 'A'-register undergoing subtraction is compared with 0x8000 ('0x' indicating that '0x' is hexadecimal number) (STEP S208). When the result of the comparison is 'A'≧0x8000, no processing is implemented, thus coding processing of 'PIX' is terminated. When the result of the comparison is 'A'<0x8000, value of the 'A'-register is compared with 'LSZ' (STEP S209). When the result of comparison is 'A'<'LSZ', addition between value of the 'C'-register and value of the 'A'-register, and substitution of 'LSZ' into 'A'-register are implemented (STEP S210). Finally, substituting 'NMPS[ST[CX]]' into 'ST[CX]'. The 'NMPS[ST[CX]]' is next objective of transition, after normalization processing (STEP S211), coding processing of 'PIX' is terminated.

FIG. 3 shows a flowchart of 'normalization processing'. One bit of Left-shift of both of 'A'-register and 'C'-register, and subtraction of 'CT'-value are implemented (STEP S300). The subtraction processing of the above-described STEP S300 is continued up to A<0x8000, at the time when 'A' comes into 'A'≧0x8000 (STEP S309), the normalization processing is terminated.

When 'CT' comes into 'CT'=0 during processing of the above described STEP S300 (STEP S301/Yes), it causes deterministic code part of the 'C'-register to be substituted into 'TEMP'-register together with carry (STEP S302). Here, 'C'-register consists of 16 bits of operation-bit, 3 bits of carry propagation absorption-bit, 8 bits of code-bit generated, and one bit of carry-bit.

When value of the 'TEMP'-register is 'TEMP'-register= '0xff' (STEP S305), count-up of variable 'SC' is implemented (STEP S306). Further, when value of the 'TEMP'-register is 'TEMP'<'0xff' (STEP S305/No), previously stored data within the buffer is outputted as code, moreover, outputting '0xff' in number of 'SC' times (STEP S307). Subsequently, initialization of 'SC' is implemented to write value of current 'TEMP'-register into the buffer (STEP S307).

In STEP S303, when value of the 'TEMP'-register is 'TEMP'>'0xff', STEP S303 adds "1" to value of the buffer, subsequently, output of content of the buffer and 'SC'-times output of "0x00" are implemented. Then, initialization of 'SC' and rewriting of 'TEMP'-register are implemented (STEP S304). Here, only real code exception for carry-bit is written into the 'TEMP'-register.

In STEP S308, 'clear' of high order bit of 'C'-register and 'initialization' of 'CT'-value are implemented.

In the conventional image coding device disclosed in the Japanese Patent Application Laid-Open No. HEI 6-121172, and the Japanese Patent Application Laid-Open No. HEI 6-225158, these devices realize real time coding. Further, the Japanese Patent Application Laid-Open No. HEI 8-154059 discloses a coding device which implements coding/decoding in high speed.

However, in algorithm of arithmetic coding of the above-described conventional example, the content of the probability transition table should be read therein from the probability transition table for predicting respective pixels, further, rewrite and read-in of 'ST' and 'MPS' should be implemented on that occasion in every respective 'CT'. Generally, probability transition table is constituted by 'ROM'. Prediction of 'CX' is implemented on 'RAM', thereby, several cycles are required for read and write thereof, thus taking times. Further, since several clocks of read/write cycles are required for coding one pixel, there occurs problem that processing is too late for image data which is inputted continuously in high speed. In recent years, concerning scanner device and so forth, image reading becomes high speed, thus image reading speed is high speed. For that reason, problem of processing speed becomes important problem.

Further, in the conventional image coding device which is disclosed in the Japanese Patent Application Laid-Open No. HEI 6-121171 and the Japanese Patent Application, there is no description concerning occurrence of 'area width' (of value of LPZ) of less probability symbol 'LPS' for the probability presumption and 'renewal' of probability presumption information. Furthermore, when the device disclosed extracts deterministic code from the 'C'-register, since code size outputted therefrom is different caused by the number of shift or the value of 'CT', subsequent processing becomes complicated.

Also, in the Japanese Patent Application Laid-Open No. HEI 8-154059, there is no description concerning occurrence of 'area width' (of value of 'LPZ') of 'LPS' for the probability presumption and renewal of probability presumption information. Furthermore, in this place, the number of shift of the 'A'-register is also used at the time of code outputting of 'C'-register. Therefore, it becomes necessary to allow overflow caused by shift, thus enlargement of bit-width is implemented.

SUMMARY OF THE INVENTION

In view of the foregoing, it is an object of the present invention, in order to overcome the above-mentioned problem, to provide an image signal processing device comprising probability presumption information processing circuit capable of implementing coding/decoding processing without delay in relation to inputted data with constant speed while implementing renewal of probability presumption information.

According to a first aspect of the present invention, in order to achieve the above-mentioned object, there is provided an image signal processing device provided with a probability presumption information processing circuit which comprises a transition state renewal part for implementing maintenance/renewal of a status ('ST') value corresponding to respective contexts ('CX') and a more probability symbol ('MPS') value of the 'CX', an 'A'-register operation part for implementing subtraction between value of an 'A'-register and occurrence probability ('LSZ') of a less probability symbol ('LPS') value, or shift of the 'A'-register, a probability transition table for outputting corresponding the 'LSZ', next objective of transition ('NMPS') when coding candidate pixel value ('PIX') is the 'MPS', next objective of transition ('NLPS') when the 'PIX' is the 'LPS', and value of occurrence of inversion of the 'MPS' value ('SWTCH'), in answer to value of inputted the 'ST', a flip-flop for adjusting timing of data, a 'C'-register operation part for implementing addition/subtraction between the 'C'-register and the 'A'-register and/or shift of the 'C'-register, and a 'CT' renewal part for generating timing of input/output of signal.

According to a second aspect of the present invention, in the first aspect, there is provided an image signal processing device, wherein the probability presumption information processing circuit is capable of being applied to coding processing and/or decoding processing.

According to a third aspect of the present invention, in the first or the second aspect, there is provided an image signal processing device, wherein the probability presumption information processing circuit in coding processing further comprises a 'PIX' comparator for discriminating whether pixel ('PIX') inputted therein is 'MPS' or 'LPS', and a code output part for extracting to be outputted a code from the 'C'-register.

According to a fourth aspect of the present invention, in the first or the second aspect, there is provided an image signal processing device, wherein the probability presumption information processing circuit further comprises an 'A'/'C' comparator for implementing comparison of value of the 'A'-register with value within bit for operation in the 'C'-register, before determining whether the 'PIX' is the 'MPS' or the 'LPS'.

According to a fifth aspect of the present invention, in the first or the second aspect, there is provided an image signal processing device, wherein the transition state renewal part comprises a 'CX' decode circuit for implementing decode of 'CX' value, an 'MPS' inversion circuit for implementing inversion of 'MPS' in accordance with value of 'SWTCH', an 'ST' renewal circuit for implementing output of 'ST[CX]' corresponding to the 'CX' inputted therein, and renewal of transition state of corresponding 'CX' for coding of next pixel, and an 'MPS' renewal circuit for implementing output of 'MPS[CX]' corresponding to 'CX' inputted therein and renewal of 'MPS' value of corresponding 'CX' for coding of next pixel.

According to a sixth aspect of the present invention, in the first or the second aspect, there is provided an image signal processing device, wherein the transition state renewal part comprises a 'CX' decode circuit for implementing decode of 'CX' value, an 'MPS' inversion circuit for implementing inversion of 'MPS' in answer to value of 'SWTCH', a 'PIX' determination circuit for calculating pixel which is result of decoding, an 'ST' renewal circuit for implementing output of 'ST' value of 'ST[CX]' corresponding to 'CX' and renewal of state of corresponding 'CX' for coding of next pixel, an 'MPS' renewal circuit for implementing output of 'MPS' value of 'MPS[CX]' corresponding to 'CX' and renewal of 'MPS' value of corresponding 'CX' for coding of next pixel, and an exclusive NOR for configuring condition of 'PIX'-determination, 'MPS'-inversion, and state transition.

According to a seventh aspect of the present invention, in the first or the second aspect, there is provided an image signal processing device, wherein the 'A'-register operation part comprises a flip-flop for implementing maintenance/renewal of value of 'A'-register, an 'A'-register subtraction control part for implementing control of subtraction of the 'A'-register, an 'A'-register comparison circuit for implementing comparison of value of 'A'—'LSZ' with value of 'LSZ', a shift quantity determination part for calculating shift quantity from value of the 'A'-register inputted therein, and a shift circuit for implementing shift of the 'A'-register in accordance with shift quantity outputted from the shift quantity determination part.

According to an eighth aspect of the present invention, in the first or the second aspect, there is provided an image signal processing device, wherein the probability transition table comprises an 'LSZ' selector for outputting value of 'LSZ' corresponding to 'ST' value inputted therein, an 'NMPS' selector for outputting value of 'NMPS' corresponding to 'ST' value inputted therein, an 'NLPS' selector for outputting value of 'NLPS' corresponding to 'ST' value inputted therein, and an 'SWTCH' selector for outputting value of 'SWTCH' corresponding to 'ST' value inputted therein.

According to a ninth aspect of the present invention, in the first or the second aspect, there is provided an image signal processing device, wherein the 'C'-register operation part comprises a flip-flop for implementing maintenance/renewal of value of the 'C'-register, an adder for implementing addition of value of the 'C'-register and value of the 'A'-register, a selector for selecting whether it causes output of the adder to be used or it causes output of the flip-flop to be used directly as value of the 'C'-register, an exclusive OR for generating control signal of the selector, a shift circuit for implementing shift of the 'C'-register in accordance with shift quantity calculated by the 'A'-register operation circuit, and a mask circuit for implementing "0"-clear of bit corresponding code-part outputted when code-output is generated.

According to a tenth aspect of the present invention, in the first or the second aspect, there is provided an image signal processing device, wherein the 'CT' renewal part comprises an adder for implementing addition of shift quantity calculated in the 'A'-register operation part and 'CT' value outputted from the flip-flop, a flip-flop for implementing maintenance of 'CT' value, and a flip-flop for implementing adjustment of timing of output signal of the adder.

According to an eleventh aspect of the present invention, in the tenth aspect, there is provided an image signal processing device, wherein the code extraction part comprises a shift circuit for extracting code from the 'C'-register in accordance with 'CT' outputted from the 'CT' renewal part.

According to a twelfth aspect of the present invention, in the third aspect, there is provided an image signal processing device, wherein the 'PIX' comparator is constituted using an exclusive NOR gate circuit.

As stated above, the image signal processing device according to the invention realizes accumulation of the status data for probability transition and the probability transition table using the logical circuit. For that reason, high-speed cycle of read and write of above-described probability presumption information is implemented, with the result that processing speed of the whole coding processing is improved.

Further, with respect to bit-width of the 'C'-register for generating code, the image signal processing device causes bit-width of bit of 'LSZ' to be equalized with bit-width of bit of definite code so that the maximum number of times of code output in coding of 1 pixel becomes 1 time. Furthermore, the image signal processing device employs the sum of shift quantity calculated in the 'A'-register operation part and 'CT' value representing code accumulated status of the definite code bit of the 'C'-register as a signal for detecting code status at the time of code output from the 'C'-register. Due to this matter, it becomes possible to perform code output smoothly from the definite bit-position without enlarging bit-width of the 'C'-register excessively.

As described above, when the present invention is used, it becomes to implement coding processing without delay to the pixel inputted continuously, thus high speed coding processing with constant speed is capable of being realized. Further, similarly, also concerning the decoding, since it is capable of outputting image without delay while implementing decoding processing continuously, it becomes possible to realize high speed decoding processing with constant speed.

Moreover, according to the invention, renewal part of probability estimation information realized using device such as ROM and/or RAM until now can be realized using logical circuit. The logical circuit is applied to a coding device and/or a decoding device so that it is capable of being processed without delay to data inputted continuously in high speed. Further, the invention causes bit-width of definite code bit within the 'C'-register to be equalized with bit-width of bit for operation, namely bit-width of 'LSZ' which is area-width of inferior symbol so as to cause the number of times of maximum code output in 1 time of processing to be 1 time, thus processing is capable of being performed smoothly to data inputted continuously.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIGS. 9A to 9D are circuit block view showing probability presumption table of the coding device, in which FIG. 9A is 'LSZ' selector, FIG. 9B is 'NMPS' selector, FIG. 9C is 'NLPS' selector, and FIG. 9D is 'SWTCH' selector;

FIG. 17 is a circuit block view showing C-register operation part of the decoding device;

FIG. 18 is a circuit block view showing CT renewal section of the decoding device;

FIG. 19 is a graph of code inputting position of the decoding device;

FIGS. 20A to 20D are graph showing various condition and α, β, γ of the decoding device;

FIG. 21 is a view showing an example of coding timing of the decoding device; and FIGS. 22A to 22C are graph showing various conditions and α, β, γ of the coding device.

DETAILED DESCRIPTION OF THE PREFERRED EMBODIMENT

A preferred embodiment of the image signal processing device according to the present invention will be described in detail in accordance with accompanying drawings. FIGS. 4 to 22 show one embodiment of the image signal processing device of the present invention.

Figure 1:
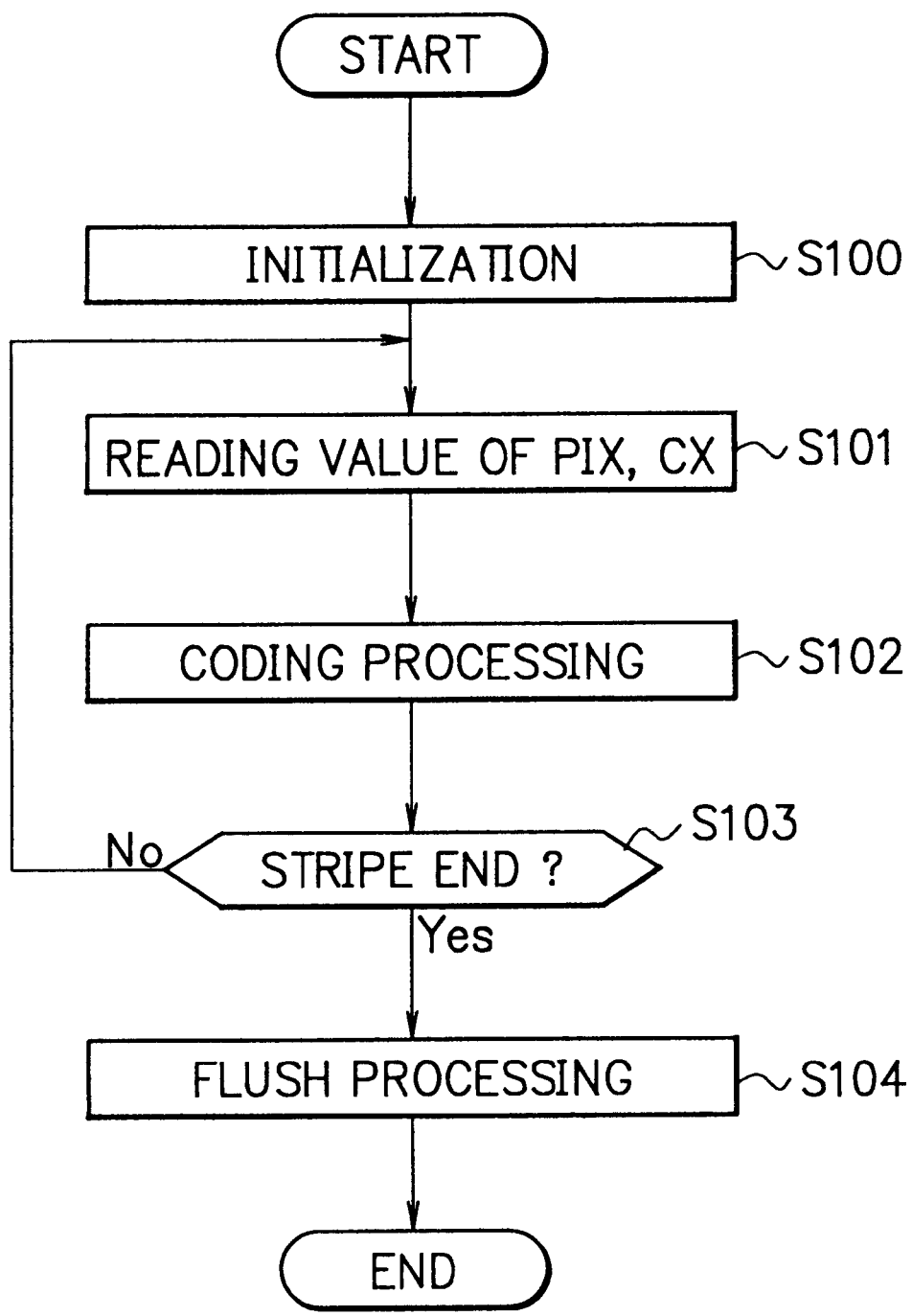
FIG. 1 is a flowchart showing a procedure example of conventional arithmetic coding.
Figure 2:
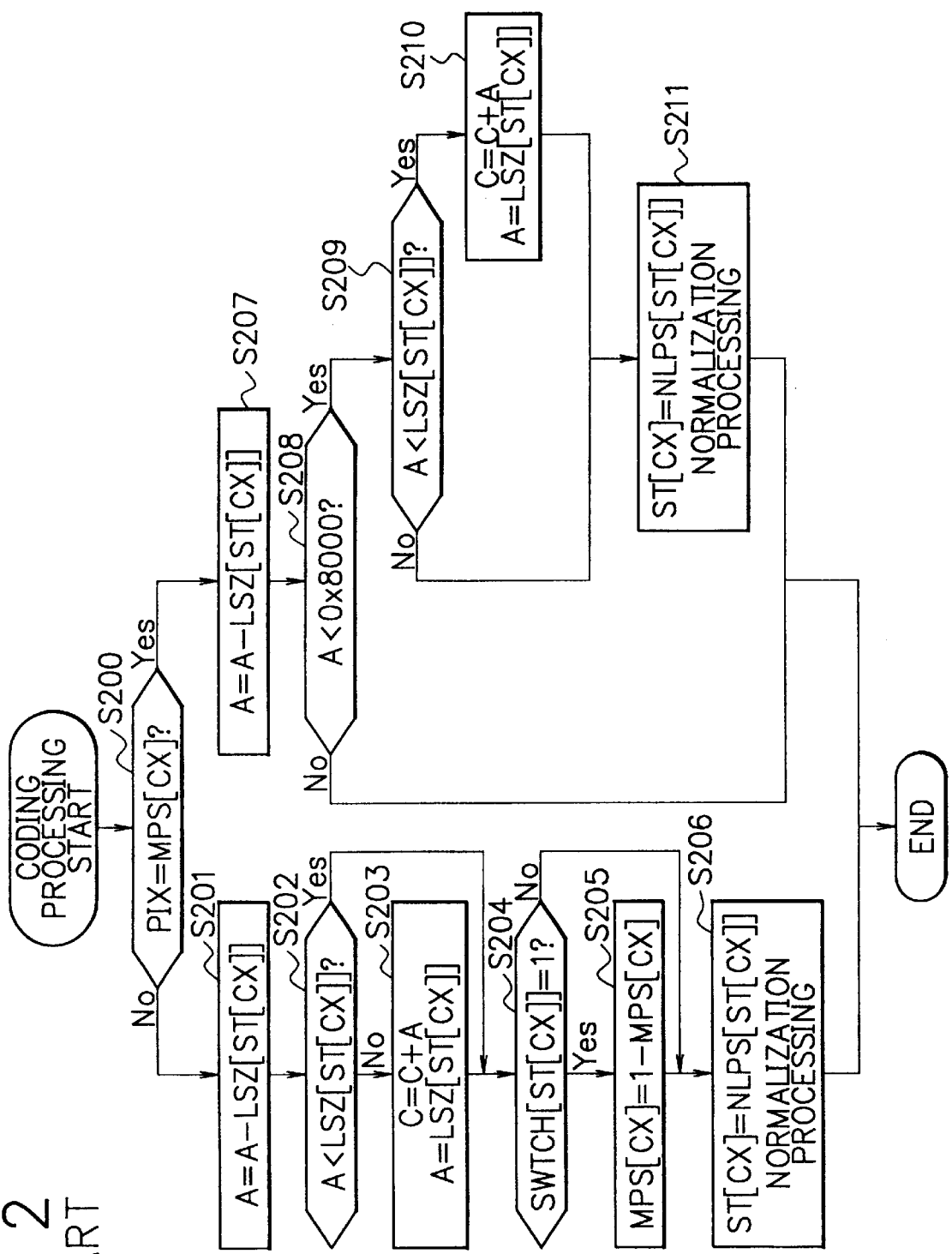
FIG. 2 is a flowchart showing a coding processing of conventional arithmetic coding.
Figure 3:
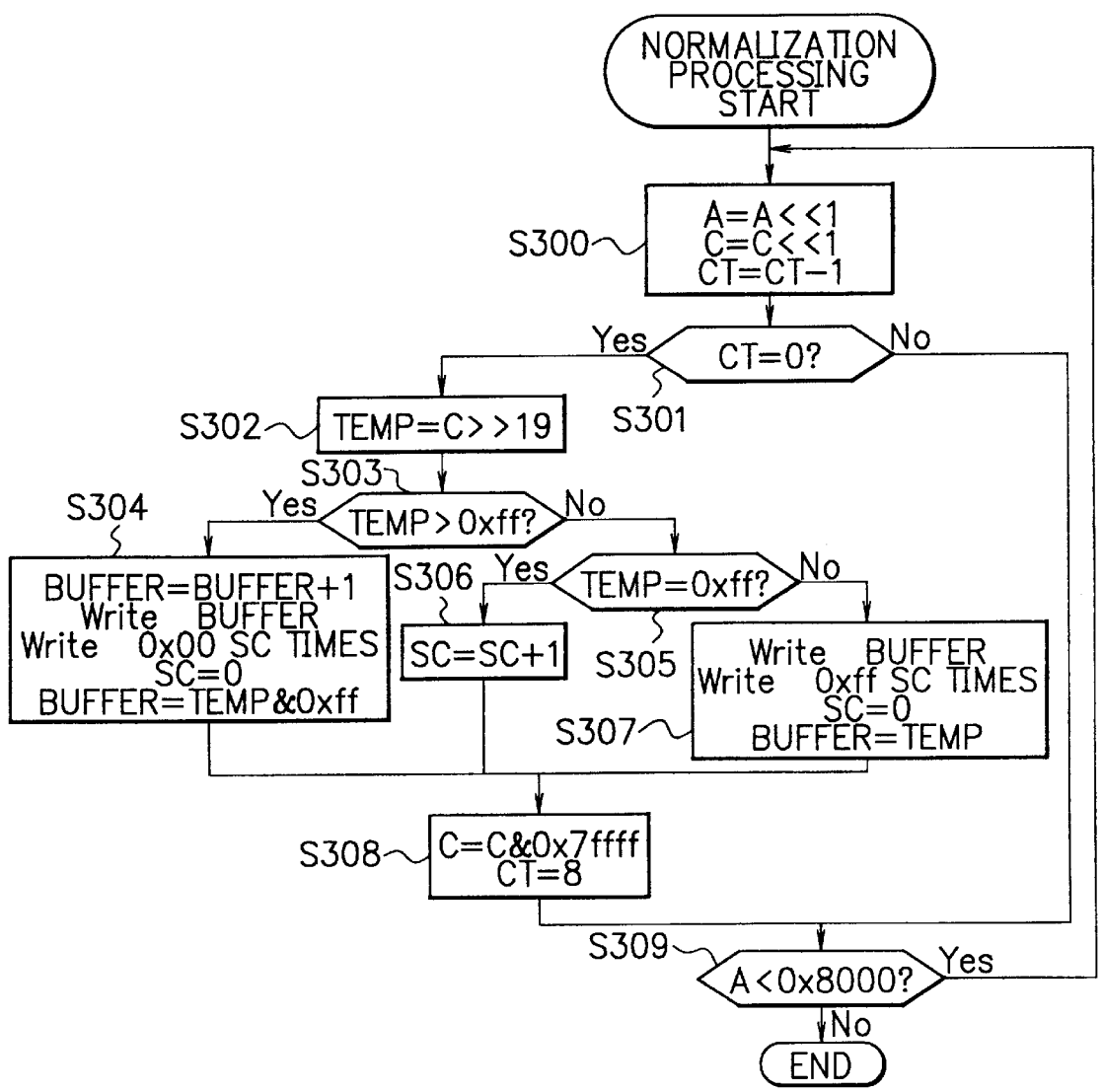
FIG. 3 is a flowchart showing a normalization processing of conventional arithmetic coding.
Figure 4:
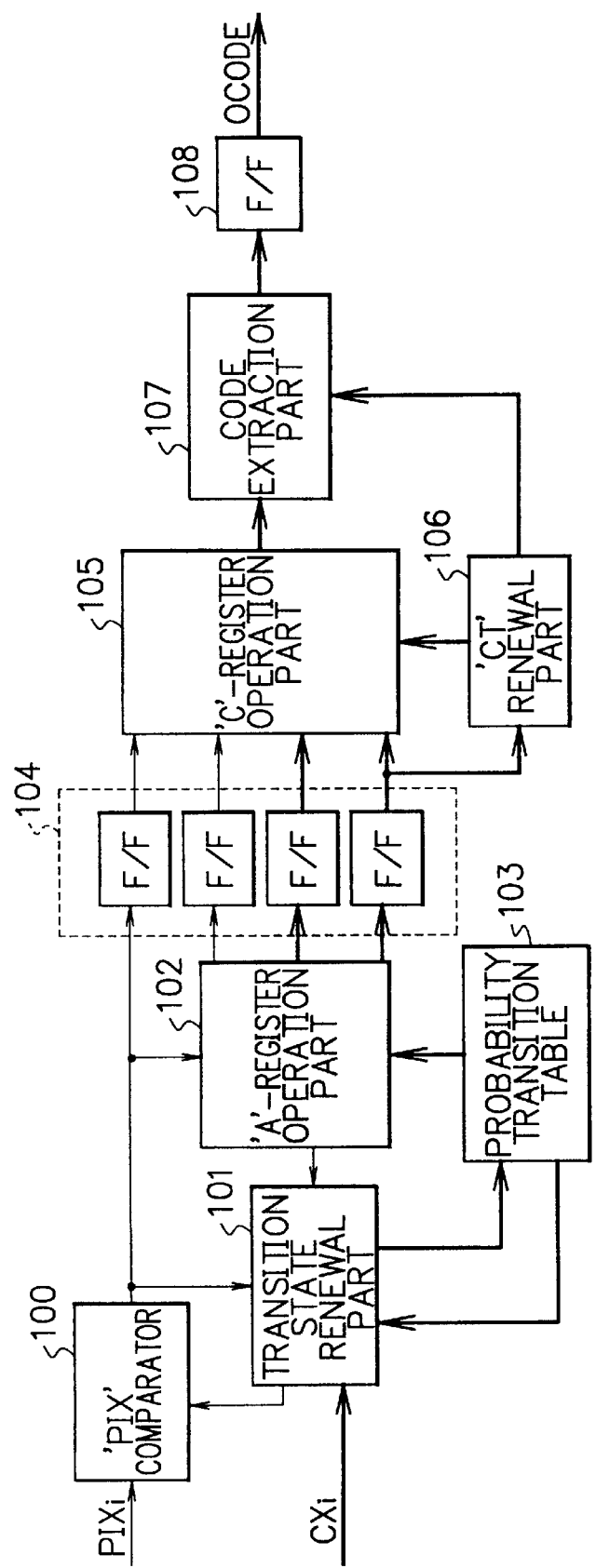
FIG. 4 is a block diagram coding device showing an embodiment of image signal processing device of the present invention.

Firstly, there will be described a configuration of the embodiment of the image coding device using the present invention. FIG. 4 is a block diagram showing constitution example of principal part of the image coding device of the present embodiment. Further, FIGS. 5 to 18 are circuit constitution block diagrams explaining more detailed constitution example of respective constitution parts of the present image coding device.

Referring to FIG. 4, the embodiment of the image coding device comprises a 'PIX' comparator 100 for judging whether the present coding candidate pixel value 'PIX' inputted therein is the more probability symbol 'MPS' or less probability symbol 'LPS', a transition state renewal part 101 for implementing maintenance/renewal of 'ST'-value or 'MTS'-value corresponding to each 'CX', an 'A'-register operation part 102 for implementing subtraction between value of 'A'-register and value of 'LSZ' or shifted-value and so forth of 'A'-register, a probability transition table 103 for outputting values of corresponding 'LSZ', 'NMPS', 'NLPS', and 'SWTCH' in answer to value of 'ST' inputted therein, flip-flops 104, and 108 for timing adjustment, a 'C'-register operation part for implementing addition of value of 'C'-register and value of 'A'-register or shift or masking of the 'C'-register, a 'CT' renewal part 106 for implementing renewal of 'CT' value and generation of code output timing, and a code extraction part 107 for extracting to be outputted code from the 'C'-register.

Figure 5:
FIG. 5 is a circuit constitution view showing PIX comparison section of the coding device.

Above described 'PIX' comparator 100, for instance, consists of an exclusive-NOR gate 109 as shown in FIG. 5, to return operation result α in relation to input of 'PIX' and 'MPS[CX]'.

Figure 6:
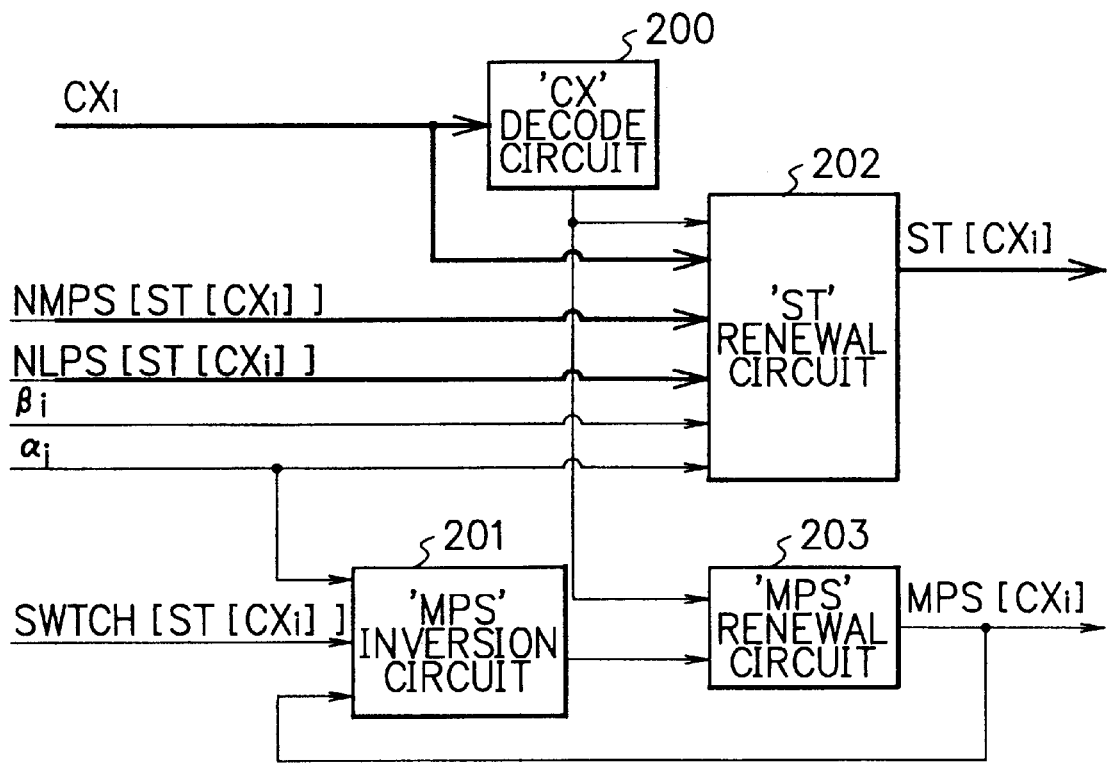
FIG. 6 is a circuit block view showing transit state renewal part of the coding device.

As shown in FIG. 6, the above-described transition state renewal part 101 comprises a 'CX' decode circuit 200 for implementing decode of 'CX' value, an 'MPS' inversion circuit 201 for implementing inversion of 'MPS' according to value of 'SWTCH', an 'ST' renewal circuit 202 for implementing output of 'ST[CX]' corresponding to inputted 'CX', and renewal of transition state of the corresponding 'CX' for coding of next pixel, and an 'MPS' renewal circuit 203 for implementing output of 'MPS[CX]' corresponding to inputted 'CX', and renewal of 'MPS' value of corresponding 'CX' for coding of next pixel.

Figure 7:
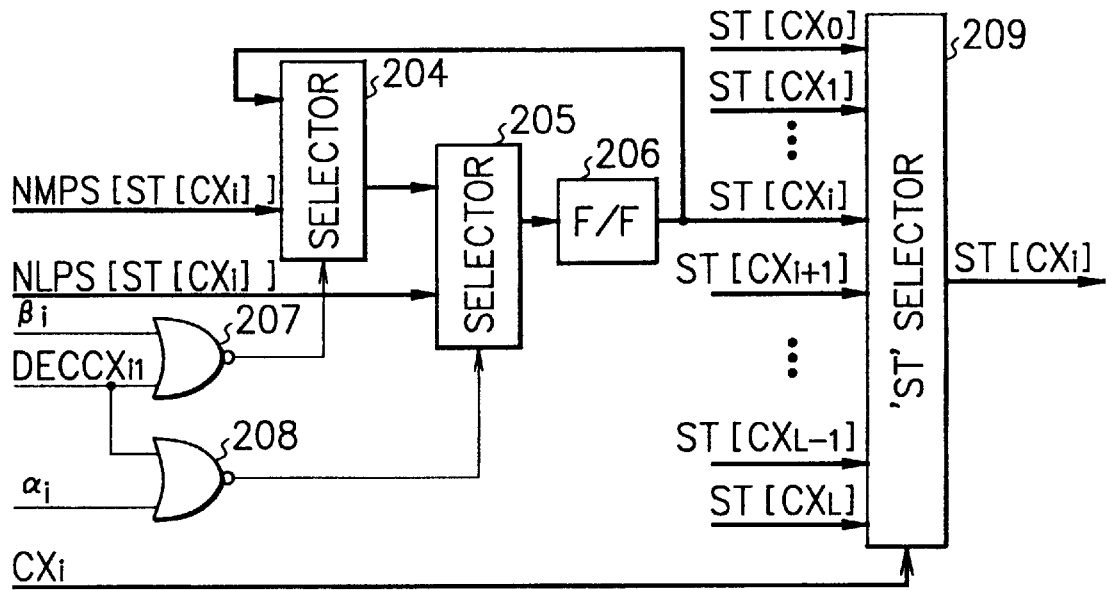
FIG. 7 is a circuit block view showing ST-selector of the coding device.

As shown in FIG. 7, the above-described 'ST' renewal circuit 202 comprises selectors 204, 205 for implementing renewal of a state 'ST' value of corresponding 'CX', NOR gates 207, 208 for generating control signal of above-described selectors 204, 205, a flip-flop 206 for maintaining 'ST' value corresponding to each 'CX', and an 'ST' selector 209 for outputting 'ST' value of 'ST[CX]' corresponding to inputted 'CX'.

Figure 8:
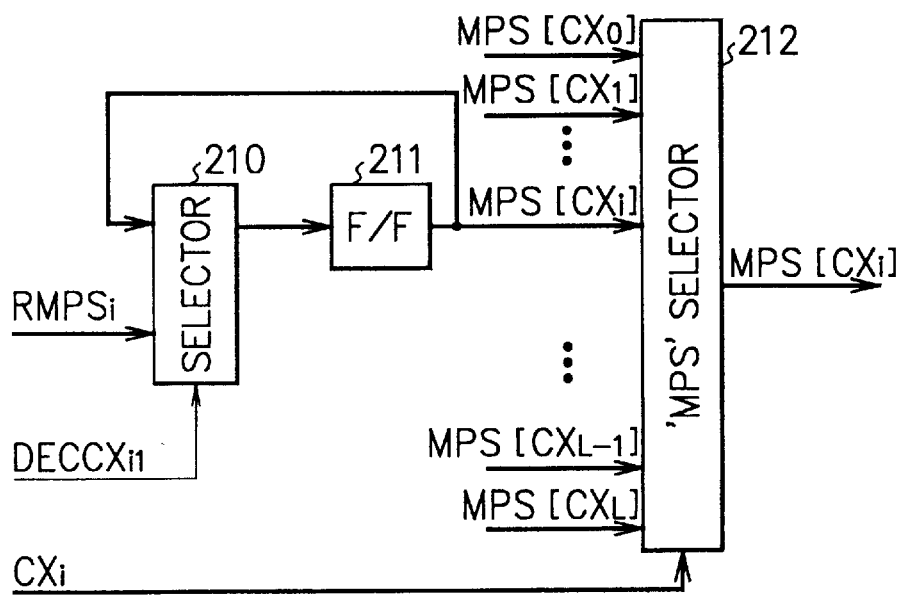
FIG. 8 is a circuit block view showing MPS-selector of the coding device.
Figure 9B:
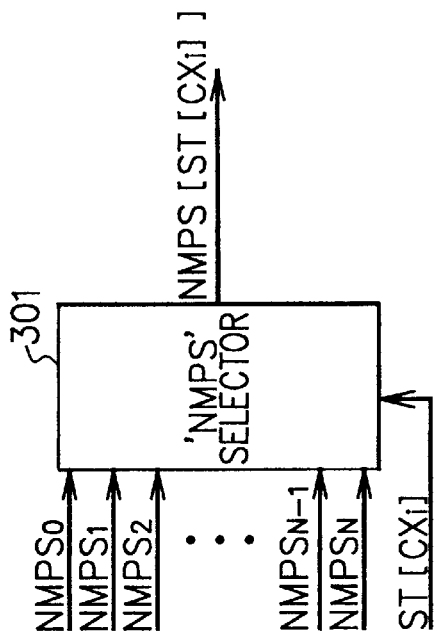
Figure 9D:
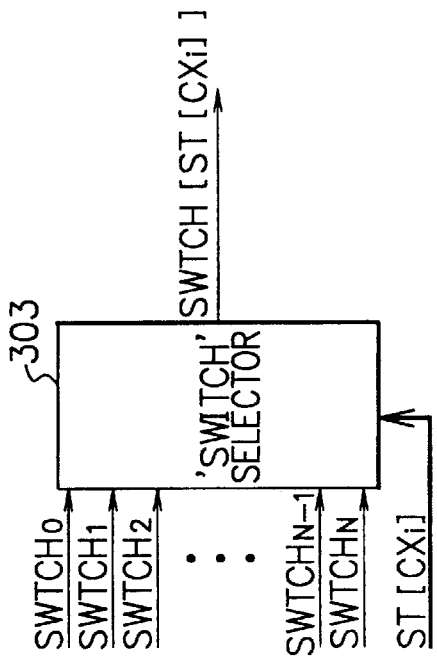
Figure 9A:
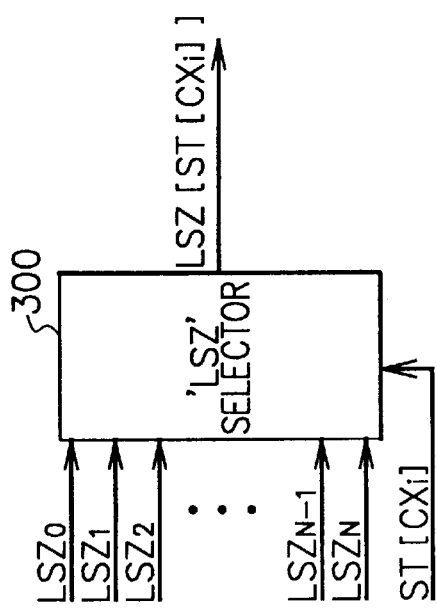
Figure 9C:
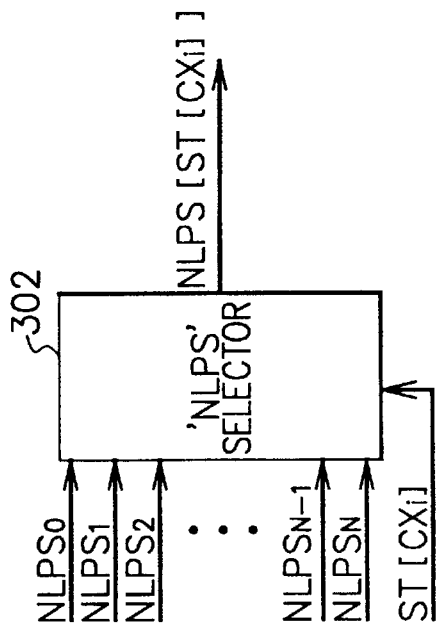

As shown in FIG. 8, the above-described 'MPS' renewal circuit 203 comprises a selector 210 for implementing renewal of 'MPS' value of corresponding 'CX', a flip-flop 211 for implementing maintenance of 'MPS' value corresponding to each 'CX', and an 'MPS' selector 212 for outputting 'MPS' value of 'MPS[CX]' corresponding to inputted 'CX'.

As shown in FIGS. 9A to 9D, the above-described probability transition table 103 comprises an 'LSZ' selector 300, an 'NMPS' selector 301, an 'NLPS' selector 302, and 'SWTCH' selector 303, for outputting respective values of 'LSZ', 'NMPS', 'NLPS', and 'SWTCH' corresponding to 'ST' value inputted therein. Here, inputs of respective selectors are constituted by logical gate.

Figure 10:
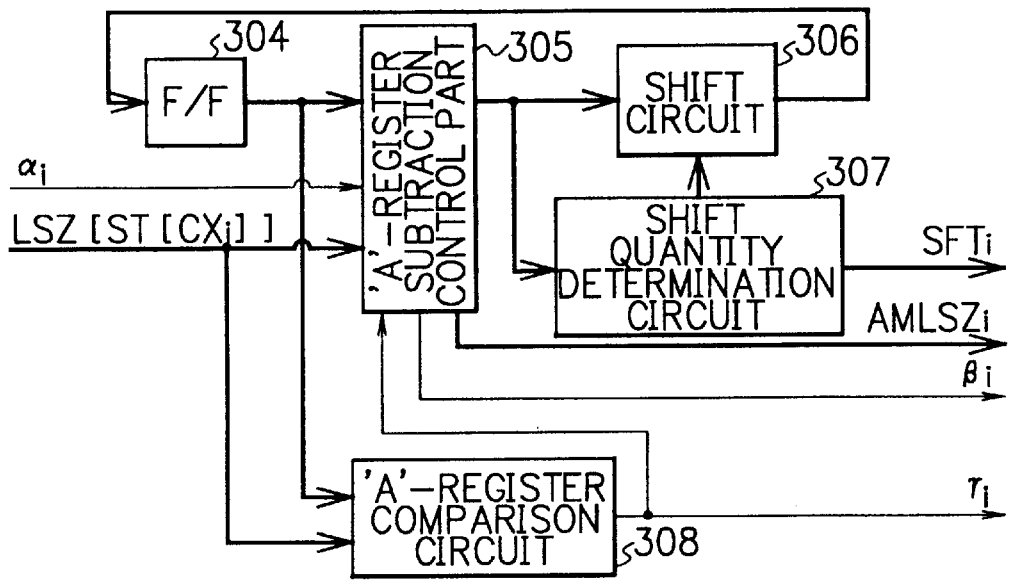
FIG. 10 is a circuit block view showing A-register operation part of the coding device.

As shown in FIG. 10, the above-described 'A'-register operation part 102 comprises a flip-flop 304 for implementing maintenance/renewal of value of 'A'-register, an 'A'-register subtraction control part 305 for implementing control of subtraction of 'A'-register, an 'A'-register comparison circuit 308 for implementing comparison between value of 'A'—'LSZ' and value of 'LSZ', a shift quantity decision circuit 307 for calculating shift quantity from value of 'A'-register inputted, and a shift circuit 306 for implementing shift of 'A'-register in accordance with shift quantity outputted from the above described shift quantity decision circuit 307.

Figure 11:
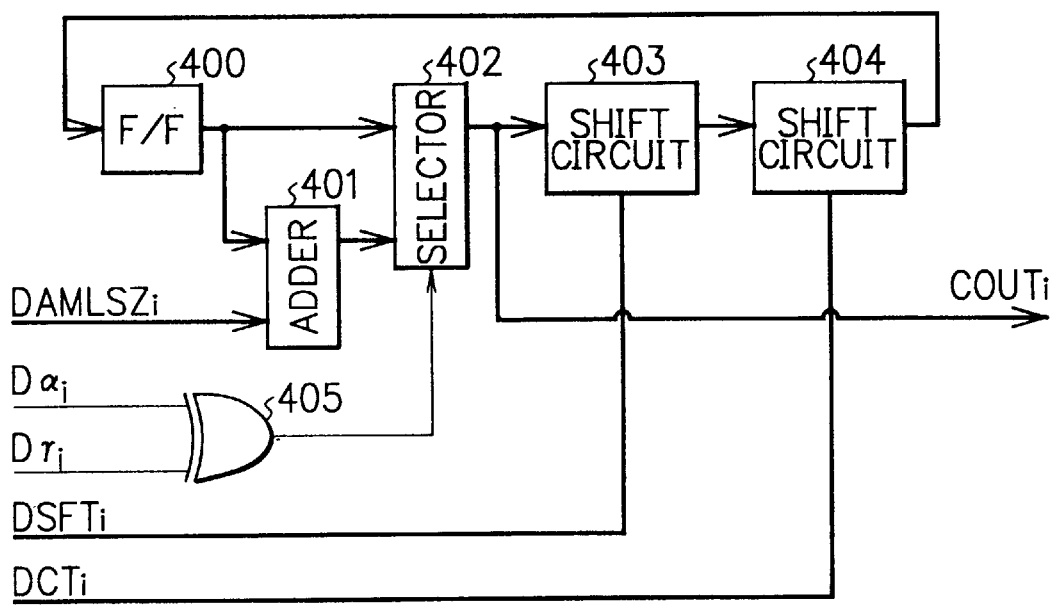
FIG. 11 is a circuit block view showing C-register operation part of the coding device.

As shown in FIG. 11, the above-described 'C'-register operation part 105 comprises a flip-flop 400 for implementing maintenance/renewal of value of 'C'-register, an adder 401 for implementing addition of value of 'C'-register and value of 'A'-register, a selector 402 for selecting whether it employs output of the above-described adder 401 or it employs directly output of the above described flip-flop 400 as value of 'C'-register, an exclusive OR 405 for generating control signal of the above-described selector 402, a shift circuit 403 for implementing shift of 'C'-register in accordance with shift quantity calculated by 'A'-register operation circuit 102, and a mask circuit 404 for implementing "0" clear of bit corresponding to code part outputted when code output occurs.

Figure 12:
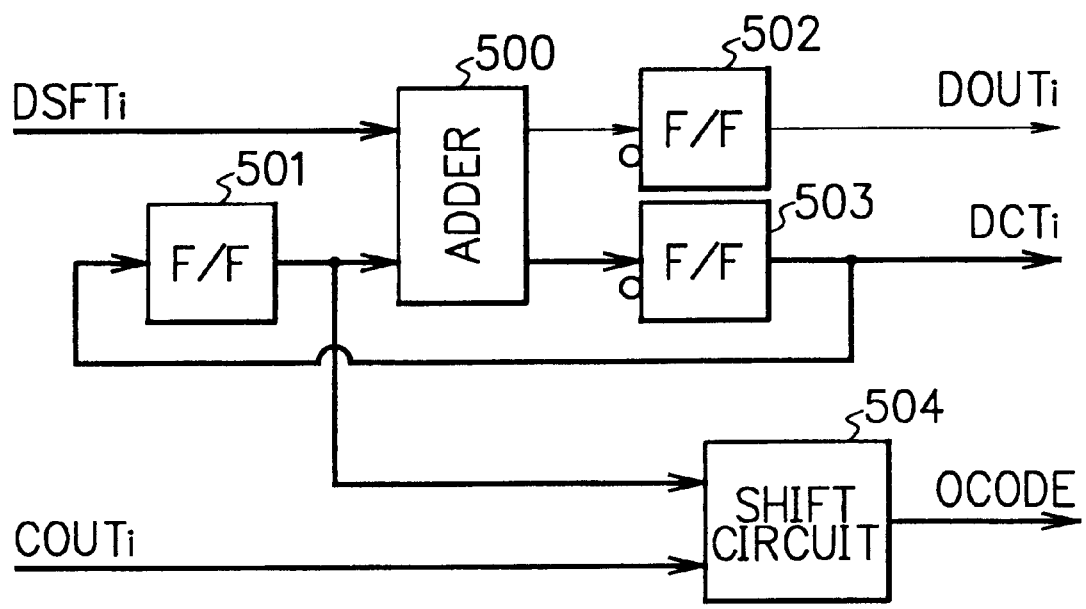
FIG. 12 is a circuit block view showing CT renewal part of the coding device.

As shown in FIG. 12, the above described 'CT' renewal part 106 comprises an adder 500 for implementing addition of shift quantity calculated by 'A'-register operation part 102 and 'CT' value outputted from a flip-flop 501, the flip-flop 501 for implementing maintenance of value of 'CT', and flip-flops 502, 503 for implementing adjustment of timing of output signal of the adder 500. Further, the code extraction part 107, also as shown in FIG. 12, consists of a shift circuit 504 for extracting code from the 'C'-register in accordance with 'CT' outputted from the 'CT' renewal part 106.

The above description indicates constitution example of the embodiment of the image coding device using the present invention. Next, there will be described constitution example of the embodiment of the image decoding device. The image decoding device is capable of being realized approximately the same constitution as that of the image coding device.

Figure 15:
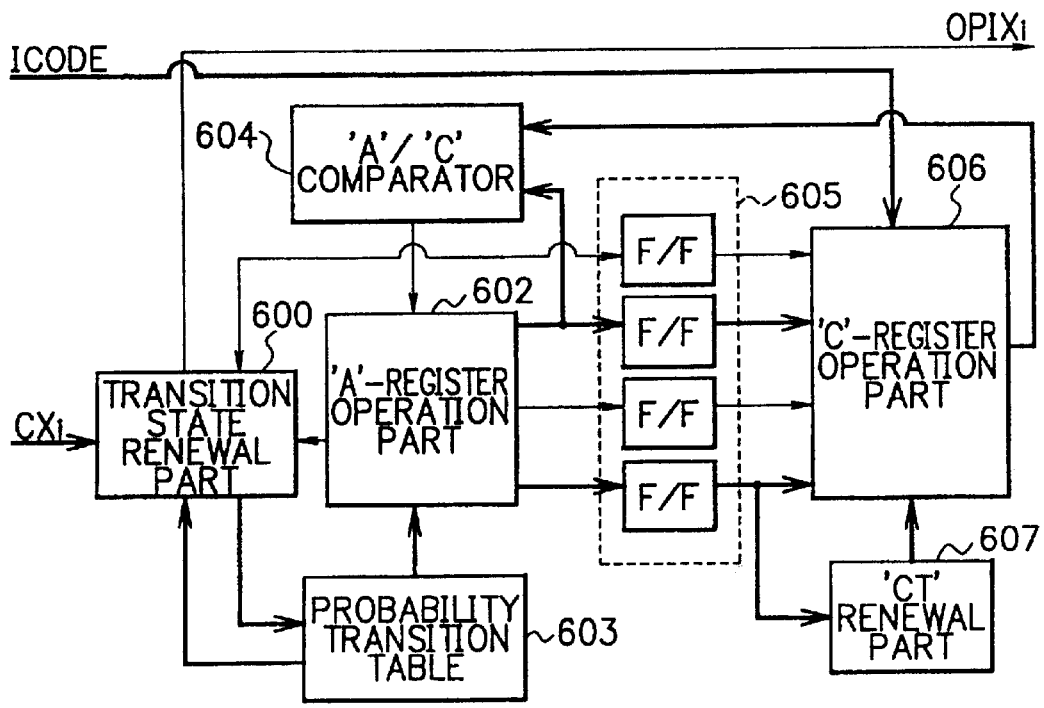
FIG. 15 is a circuit block view showing a decoding device.

FIG. 15 is a block diagram showing an embodiment of the image decoding device of the present invention. The image decoding device comprises a transition state renewal part 600 for implementing renewal/maintenance of 'ST' and 'MPS' in relation to each 'CX', further, implementing calculation of 'PIX' to be result of decoding, a probability transition table 603 for outputting values of corresponding 'LSZ', 'NMPS', 'NLPS', 'SWTCH' and so forth in answer to 'ST' inputted therein, an 'A'-register operation part 602 for implementing subtraction between value of 'A'-register and 'LSZ' and shift and so forth of the 'A'-register, an 'A/C' comparator 604 for determining whether 'PIX' is 'MPS' or 'PIX' is 'LPS' while implementing comparison of value within bit for operation in the 'C'-register with value of the 'A'-register, a flip-flop 605 for adjusting timing of data, a 'C'-register operation part 606 for implementing input of code, subtraction between value of 'C'-register and value of 'A'-register, and shift and so forth of the 'C'-register, and a 'CT' renewal part 607 for generating timing of code input.

Figure 16:
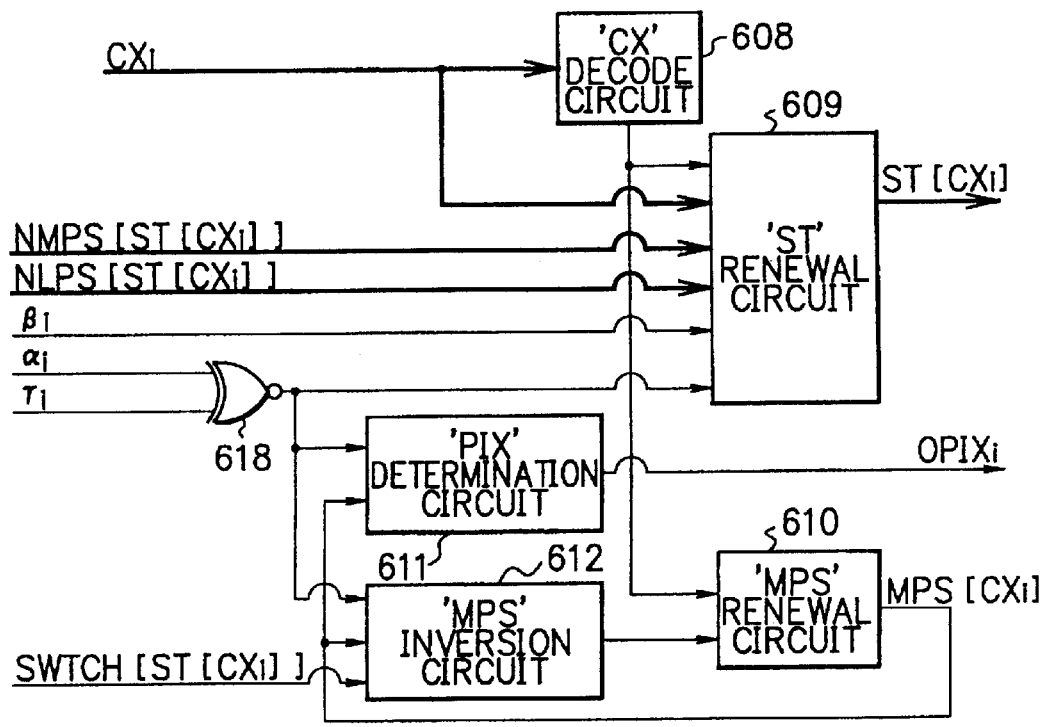
FIG. 16 is circuit block view showing transition state renewal part of the decoding device.

As shown in FIG. 16, the above-described transition state renewal part 600 comprises a 'CX' decode circuit 608 for implementing decode of value of 'CX', an 'MPS' inversion circuit 612 for implementing inversion of 'MPS' in answer to value of 'SWTCH', a 'PIX' determination circuit 611 for calculating pixel to be result of decoding, an 'ST' renewal circuit 609 for implementing output of 'ST' value of 'ST [CX]' corresponding to 'CX', and renewal of status of corresponding 'CX' for coding of next pixel, an 'MPS' renewal circuit 610 for implementing output of 'MPS' value of 'MPS[CX]' corresponding to 'CX', and renewal of 'MPS' value of corresponding 'CX' for coding of next pixel, and exclusive NOR for generating condition of 'PIX' determination or 'MPS' inversion and state transition.

As shown in FIG. 17, above-described 'C'-register operation part 606 comprises a code input circuit 613 for inserting code inputted into appropriated position within the 'C'-register according to value of 'CT', a flip-flop 614 for implementing maintenance/renewal of value of 'C'-register, a subtracter 615 for implementing subtraction between value of 'C'-register and value of 'A'-register, a selector 616 for selecting whether it uses result of subtraction or it uses result of no subtraction, and a shift circuit 617 for implementing shift of the 'C'-register in accordance with shift quantity calculated by the 'A'-register operation part 602.

As shown in FIG. 18, the above-described 'CT' renewal part 607 comprises an adder 620 for implementing addition of shift quantity calculated by 'A'-register operation part 602 and present 'CT' value, a flip-flop 619 for implementing maintenance value of 'CT', and a flip-flop 621 for implementing adjustment of timing of signal of output result of the adder.

The above description is a constitution example the embodiment of the image decoding device using the present invention.

Next, there will be described operation example of image decoding of FIG. 4 in accordance with FIGS. 5 to 22.

Firstly, pixel 'PIX$_i$' which should be coded and a context 'CX$_i$' corresponding to 'PIX$_i$' are inputted. Here, 'PIX' and 'CX' are continuously inputted to a clock, a mark 'i' indicates pixel inputted i-th in order. Further, 'CX$_i$' is value of K-bit constituted by K pieces of reference pixel (K is positive integer). When 'CX$_i$' is inputted to the transition state renewal part 101, 'CX$_i$' is inputted to 'ST' renewal circuit 202 and 'MPS' renewal circuit 203 of FIG. 6, these are inputted as selector control signal of both of 'ST' selector 209 of FIG. 7, and 'MPS' selector 212 of FIG. 8 respectively. In respective selectors 209, and 212, 'ST[CX$_i$]', 'MPS[CX$_i$]' are selected to be outputted in answer to 'CX$_i$' inputted therein. Here, 'ST' is set to value of M bits, and 'MPS' is set to value of 1 bit. Above-described 'ST' of the 'ST' selector 209 is selected from L pieces (L=2$^K$) of 'ST's corresponding to $2^K$ kinds of 'CX's, and above-described 'MPS' of the 'MPS' selector 212 is selected from L pieces (L=2$^K$) of 'MPS's corresponding to $2^K$ kinds of 'CX's. The 'ST[CX$_i$]', 'MPS[CX$_i$]' selected are outputted to the probability transition table 103 and the 'PIX' comparator 100 respectively.

As described using FIG. 5, in the 'PIX' comparator 100, calculation of exclusive NOR is implemented between 'PIX$_i$' inputted 'MPX[CX$_i$]' outputted from the transition state renewal part 101, thus '$\alpha_i$' is outputted as a result of the above calculation. Here, when 'PIX$_i$' is 'PIX$_i$'='MPS[CX$_i$]', '$\alpha_i$' is '$\alpha_i$'=1, while when 'PIX$_i$' is 'PIX$_i$'≠'MPS[CX$_i$]', '$\alpha_i$' is '$\alpha_i$'=0.

Referring to FIGS. 9A to 9D, in the probability transition table 103, 'LSZ[ST[CX$_i$]]' in the 'LSZ' selector 300, 'NMPS[ST[CX$_i$]]' in the 'NMPS' selector 301, 'NLPS[ST[CX$_i$]]' in the 'NLPS' selector 302, and 'SWTCH[ST[CX$_i$]]' in the 'SWTCH' selector 303 are outputted in accordance with 'ST[CX$_i$]' inputted therein. When state number (total number of 'ST') of probability is set to 'N', input terminals of respective selector become 'N', since 'ST' is constituted by 'M' bits, it becomes $2^{M-1} < N \leq 2^M$. 'LSZ[ST[CX$_i$]]' is outputted to 'A'-register operation part 102. 'NMPS[ST[CX$_i$]]', 'NLPS[ST[CX$_i$]]', and 'SWTCH[ST[CX$_i$]]' are outputted to the transition state renewal part 101.

Referring to FIG. 10, in the 'A'-register operation part 102 of FIG. 4, 'A'-register subtraction control part 305 implements 'A'—'LSZ[ST[CX$_i$]]', thus result of the above subtraction is outputted from the 'A'-register subtraction control section 305 as 'AMLSZ$_i$'. The above 'AMLSZ$_i$' outputted is compared with 'LSZ[ST[CX$_i$]]' in the 'A'-register comparison circuit 308, thus '$\gamma_i$' to be a comparison result is outputted. Here, when 'A' is 'A'<'LSZ[ST[CX$_i$]]', it becomes '$\gamma_i$'32 0, while when 'A' is 'A'≧'LSZ[ST[CX$_i$]]', it becomes '$\gamma_i$'=1. In the above-described 'A'-register subtraction control part 305, control of 'A'-register is implemented using above-described '$\gamma_i$' and '$\alpha_i$' inputted from 'PIX' comparator 100. A signal outputted from 'A'-register subtraction control part 305 to a shift circuit 306, or shift quantity determination circuit 307, when result of exclusive OR is "0" between '$\alpha_i$' and '$\gamma_i$', becomes 'A'—'LSZ[ST[CX$_i$]]', while when result of exclusive OR is "1" between '$\alpha_i$' and '$\gamma_i$', an output of the flip-flop 304 becomes value of 'A'-register.

Further, the highest order of 1-bit of the above-described output signal outputted from the 'A'-register subtraction control part 305 is inputted to the transition state renewal part 101 of FIG. 4 as '$\beta_i$'. Here, '$\beta_i$' becomes value indicating whether or not 'A' is as being 'A'<0x8000. When '$\beta_i$' is '$\beta_i$'=0, it is 'A'<0x8000, while when '$\beta_i$' is '$\beta_i$'=1, it is 'A'≧0x8000. The value of 'A'-register outputted from the 'A'-register subtraction control part 305 is inputted to the shift quantity determination circuit 307. When 'A' is 'A'<0x8000, left shift quantity of the 'A'-register is calculated up to 'A'≧0x8000, thus outputting to the shift circuit 306.

In the above described shift circuit 306, the left-shift of the 'A'-register is implemented in answer to shift quantity inputted. Subsequently, value of the 'A'-register is maintained by the flip-flop 304 again. The operation of the 'A'-register ends in the coding of the 'PIX$_i$'.

Both of 'β$_i$' outputted from the above-described 'A'-register and '60$_i$' outputted from the 'PIX' comparator 100 are inputted to the transition state renewal part 101. Referring to FIG. 6, in the transition state renewal part 101, 'α$_i$' is inputted to the 'MPS' inversion circuit 201, and the 'ST' renewal circuit 202, and 'β$_i$' is inputted to the 'ST' renewal circuit 202. Further, 'CX$_i$' which is inputted to the transition state renewal part 101 is inputted to the 'CX' decode circuit 200, thus causing 'DECCX$_{i1}$' which is 'DECCX' signal corresponding to the above described 'CXi' to be '0' (zero). Here, '1' is an integer of $0 \leq$ '1' $<L$, which is obtained in such a way that it causes 'K' bits of 'CXi' to be decoded. The 'DECCX$_{i1}$' is inputted both to the 'ST' renewal circuit 202 and the 'MPS' renewal circuit 203.

Referring to FIG. 7, in the 'ST' renewal circuit 202, when 'β$_i$'=0 and 'DECCX$_{i1}$'=0 in the selector 204, 'NMPS[ST[CX$_i$]]' is selected to be outputted. In the selector 205, when 'β$_i$'=0 and 'DECCX$_{i1}$'=0, 'NLPS[ST[CX$_i$]]' is selected to be outputted. Namely, in the above-described selectors 204, 205, a probability state transition is implemented concerning 'CX$_i$' in coding. The result of operation of the above-described selector 205 is maintained by the flip-flop 206. The probability state transition concerning 'PIX$_i$' ends. The result of operation of the above-described selector 205 is used for subsequent coding of pixel. As a result, the probability state transition becomes possible to realize by only "1" clock.

In the 'MPS' inversion circuit 201, in the case of 'SWTCH[ST[CX$_i$]]'=1 and 'α$_i$'=0, an inversion of 'MPS[CX$_i$]' is implemented. An 'RMPS$_i$' which is an output data of the 'MPS' inversion circuit 201 is inputted to the 'MPS' renewal circuit 203, thus the 'MPS' renewal circuit 203 selects whether a value of the 'MPS' is renewed in the selector 210 according to a value of 'DECCX$_{i1}$'. The output result of the above-described selector 210 is maintained by flip-flop 211. State renewal of 'MPS' concerning 'PIX$_i$' ends. The output result of the above-described selector 210 is used for subsequent coding of pixel. According to this operation, renewal of the 'MPS' value to the 'CX$_i$' is completed. FIGS. 22A to 22C show meaning of signal of 'α' 'β' 'γ' in coding processing, discrimination condition of 'MPS', and 'ST' renewal condition.

Shift quantity 'SFT$_i$' outputted from the 'A'-register operation part 102 and value 'AMLSZ$_i$' of 'A'—'LSZ[ST[CX$_i$]]' are subjected to timing adjustment in flip-flop 104, before being inputted to the 'C'-register 105 as 'DSFT$_i$' and 'DMLSZ$_i$' respectively. Further, similarly, 'α$_i$' outputted from the 'PIX' comparator 100 is also inputted to the 'C'-register operation part 105 as 'Dα$_i$'.

Figure 13:
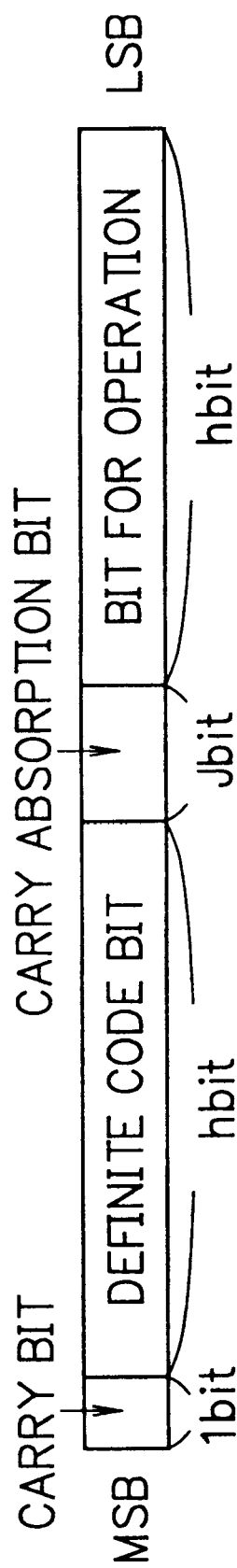
FIG. 13 is a view showing constitution example of C-register of the coding device.

Referring to detailed block diagram of the 'C'-register operation part 105 of FIG. 11, in the 'C'-register operation part, a selection processing between an addition result a value of 'C'-register and a value of 'DAMLSZ$_i$' in the adder 401, and an output of a flip-flop 400 is implemented in a selector 402 according to an output of an exclusive OR 405 of 'Dα$_i$' and 'Dγ$_i$'. Here, in the case of ('Dα$_i$'=0 & 'Dγ$_i$'=1) or ('Dα$_i$'=1 & 'Dγ$_i$'=0), a value added is selected. Subsequently, the output of the above-described selector 402 is inputted to a shift circuit 403, thus bit-shift toward upper-side of the 'C'-register is implemented in accordance with shift quantity 'DSFT$_i$' outputted from the 'A'-register operation part 102 of FIG. 4. Here, when a value of 'LSZ' is constituted by "h bits", a definite code bit of the 'C'-register is constituted by "h bits". As a result, constitution of the 'C'-register becomes constitution as shown in FIG. 13. According to this matter, the number of times of code output in coding of 1 pixel becomes 1 time at the maximum number, thus it becomes possible to perform coding of pixel inputted continuously without delay.

In FIG. 13, 'J' which is a size of a carry absorption bit is a value satisfying $2^{J-1} < h \leq 2^J$. (in the present embodiment, since 'LSZ' is constituted by 16 bits, h=16, J=4 are adopted) The data outputted from the shift circuit 403 is inputted to a mask circuit 404.

In the mask circuit 404, when 'DOUT$_i$' which represents occurrence of code output is "1", clear of bit corresponding to code data outputted in the definite code bit of the 'C'-register. Bit-length and position of the bit which is to be cleared differ according to condition of the 'C'-register, clear-limit is specified according to 'DCT$_i$' signal. The processing of the mask circuit 404 ends, subsequently, the value of the 'C'-register is maintained in the flip-flop 400 again, thus, the value is used for next coding of pixel. According to the above processing, the operation processing of the 'C'-register concerning 'PIX$_i$' ends.

Figure 14:
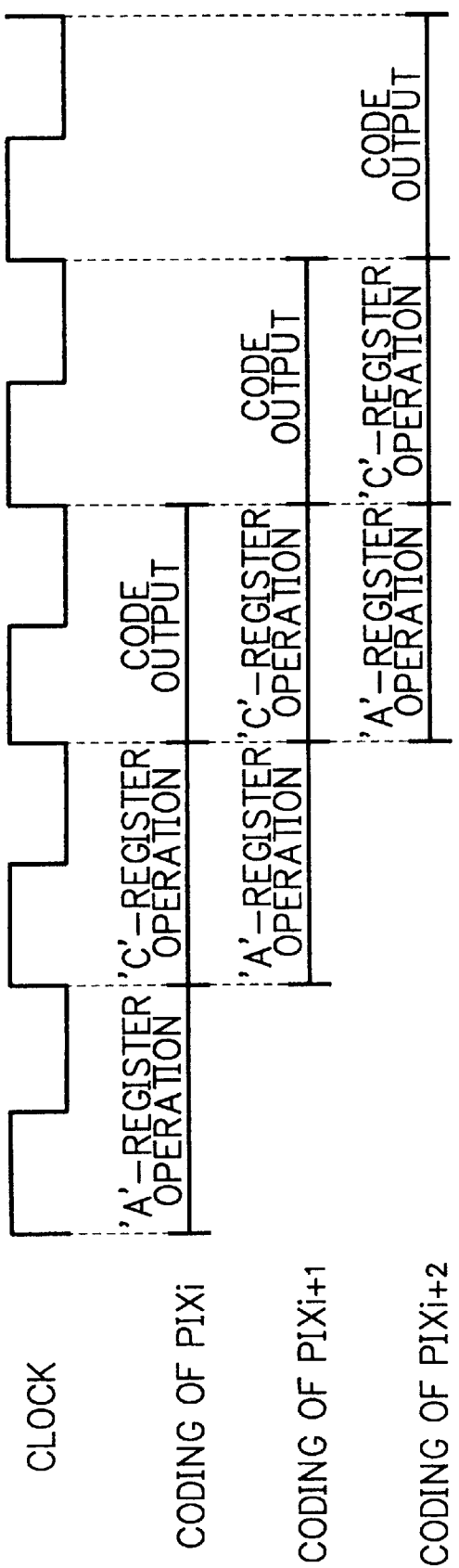
FIG. 14 is a view showing an example of coding timing of the coding device.

Both of the 'DOUT$_i$' and the 'DCT$_i$' used in the above-described 'C'-register operation part 105 are generated from the 'CT' renewal part 106. Referring to FIG. 14, in the 'CT' renewal part 106, an adder 500 calculates code output timing using shift quantity 'DSFT$_i$' calculated in the 'A'-register operation part, and 'CT' value of 'CT$_{i-1}$' on one front side thereof maintained in flip-flop 501. Here, when bit-length of 'DSFT$_i$' is set to 'y-bits', 'CT$_i$' is constituted by 'y-bits', thus the adder 500 becomes 'y-bit adder'. Further, 'CT' represents code accumulation condition in the definite code bit within the 'C'-register. In the case of 'CT'=0, it is represented that code is not accumulated in the definite code bit, while in the case of 'CT'=h−1, it is represented that code is accumulated fully in the definite code bit. When carry signal 'OUT$_i$' of the adder 500 is "1", it represents that code output is generated. The outputs of the adder 500 are outputted to the 'C'-register operation part 105 as 'DOUT$_i$' and 'DCT$_i$' via flip-flops 502, 503 respectively. Also 'DCT$_i$' is inputted to the flip-flop 501 to be used for coding of next pixel.

Code data accumulated in definite code bit of the 'C'-register is extracted in a code extraction part 107 to be outputted. Referring to FIG. 12, the code extraction part 107 is constituted by a shift circuit 504. With respect to value 'COUT$_i$' of the 'C'-register inputted from the 'C'-register operation part 105, shift toward upper side of the 'C'-register is implemented such that the whole definite code bit within the 'C'-register is filled up in accordance with 'CT$_{i-1}$' which is 'CT' value on one front thereof, namely up to the position where code output is implemented while coming to 'CT'=h−1. The shift circuit 504 extracts to be outputted upper h+1 bits ('h' is definite code bit size, and 1 bit is carry-bit) from the shifted result as a code.

A flip-flop 108 ascertains existence of code output according to 'DOUT$_i$' signal outputted from the 'CT' renewal part 106 to output code. FIG. 14 shows timing of coding processing. The coding processing can be roughly divided into three processes of 'A'-register operation, 'C'-register operation, and code output. The above-described three processes are processed in accordance with pipeline process so that it is capable of being implemented coding of pixel continuously.

The embodiment of the image coding device is described as above. The integers 'h', 'J', 'K', 'L', 'M', 'N, 'y' of respective variables are changeable voluntarily within the conditions. Further, the 'ST' renewal part and the 'MPS' renewal part of FIGS. 6, 7, are constituted by flip-flop in the embodiment, however, they are capable of being constituted by latch-gate and so forth.

Next, there will be described an embodiment of an image decoding device to the image coding device using the present invention in accordance with the accompanying drawings.

In FIG. 15, when code 'ICODE' is inputted to 'C'-register operation part 606, 'ICODE' is inputted to a code input circuit 613 of FIG. 17. In the above-described code input circuit 613, the 'ICODE' is taken in the 'C'-register with timing of 'OUT$_i$'=1, namely with timing where code input demand occurs. The 'ICODE' on the 'C'-register is taken in an appropriate position while using 'CT$_i$' indicating code use condition of the 'C'-register.

FIG. 19 shows relationship between code condition within the 'C'-register and 'CT'. Size of the 'C'-register is constituted by 2×h bits when bit-size of 'LSZ' is set to h-bits while giving consideration to the maximum shift quantity of the 'A'-register. For that reason, in decoding of 1 pixel, only one time of code input is implemented at the maximum number of times. Table of FIG. 19 is a table in which 'LSZ' and input code are assumed as 16 bits, thus size of the 'C'-register becomes 32 bits. Lateral items within the table indicates 'CT' value, and longitudinal item 'CIxx' represents the 'C'-register after code inputting, and 'xx' indicates bit-position thereof. The 'Cxx' within the table represents effective code within the 'C'-register after passed through a shift circuit 617, and 'Ixx' represents code inputted. Further, "0" is inputted to bit to be lower rank than input code. The data of the 'C'-register after inputting is outputted to an A/C comparator 604 with h bits of higher rank as 'CHIGH$_i$'. An output data of the code input circuit 613 is maintained by a flip-flop 614, to be used for decoding of next pixel. An output of the flip-flop 614 is outputted to a subtracter 615 and a selector 616.

In the subtracter 615, subtraction is implemented between value of 'DAMLSZ$_i$' whose timing adjustment is implemented while being outputted from an 'A'-register operation part 602 and value 'CHIGH$_i$' of higher rank h bits of the 'C'-register. In the selector 616, selection is implemented whether it uses result of the subtracter 615 as a next 'C'-register or it uses data directly inputted from the flip-flop 614. The control, in the case of 'D$\alpha_i$'=0 namely 'A'≦'CHIGH$_i$', becomes control for selecting subtraction result. In the shift circuit 617, shift toward higher rank side of the 'C'-register is implemented according to shift quantity calculated in the 'A'-register operation part 602.

The 'CT$_i$' and the 'OUT$_i$' which are used in the above-described code input circuit 613 are generated in the 'CT' renewal part 607. In FIG. 18, shift quantity 'DSFT$_i$' calculated in the 'A'-register operation part 602 is added to 'CT$_{i-1}$' to be code condition of the 'C'-register after decoding of front pixel maintained in the flip-flop 619 by adder 620. When bit-length of 'DSFT$_i$' is set to 'y' bits, also 'CT' is constituted by 'y' bits, thus the adder 620 becomes 'y'-bit adder. A carry signal 'OUT$_i$' of the above-described adder 620 represents that when value thereof is "1", input of code is required. An addition result of the above-described adder 620 informs the 'C'-register operation part 606 of code input position as 'CT$_i$'. As above, operation processing of the 'C'-register is implemented concerning pixel 'PIX$_i$' due to operation of the 'C'-register operation part and the 'CT' renewal part.

The A/C comparator 604 compares data 'CHIGH$_i$' outputted from the 'C'-register operation part 606 with value of the 'A'-register. The value of the 'A'-register is 'A'—'LSZ [ST[CX$_i$]]'. A signal '$\alpha_i$' outputted from the above-described 'A'/'C' comparator is as being '$\alpha_i$'=1 in the case of 'A'>'CHIGH$_i$', while in the case of 'A'≦'CHIGH$_i$', '$\alpha_i$' is as being '$\alpha_i$'=0.

Referring to FIG. 16, in the transition state renewal part 600, the 'CX$_i$' inputted is inputted to 'CX' decode circuit 608, 'ST' renewal circuit 609, and 'MPS' renewal circuit 610. In the 'CX' decode circuit 608, decode processing of value of 'K' bits is implemented causing signal 'DECCX' corresponding to present 'CX' to set to "0". The 'ST' renewal circuit 609 has approximately the same circuit constitution (FIG. 7) as the case of coding, however, the '$\alpha_i$' of input in FIG. 7, becomes output of exclusive NOR 618 at the time of decoding. The 'MPS' renewal circuit 610 has the same circuit constitution (FIG. 8) as the case of coding.

The above-described 'ST' renewal circuit 609 and the 'MPS' renewal circuit 610 output 'ST[CX$_i$]' and 'MPS [CX$_i$]' respectively in accordance with 'CX$_i$' inputted. Further, after determination of values of '$\alpha_i$' in the 'A'/'C' comparator 604, '$\beta_i$' and '$\gamma_i$' in the 'A'-register operation part 602, 'NMPS[ST[CX$_i$]]' and 'NLPS[ST[CX$_i$]]' in the probability transition table, respective renewals of 'ST' and 'MPS' are implemented in the 'ST' renewal circuit and the 'MPS' renewal circuit in the same way as coding processing. Also the 'MPS' inversion circuit 612 implements the same operation as the case of coding processing with the exception that '$\alpha_i$' signal is changed into operation result signal of exclusive OR between '$\alpha_i$' and '$\gamma_i$'. In the 'PIX' determination circuit 611 implements determination of 'PIX$_i$' according to value of exclusive NOR between '$\alpha_i$' and '$\gamma_i$'. In the case of '$\alpha_i$'=$\gamma_i$', 'PIX$_i$' is set to 'PIX$_i$'='MPS[CX$_i$]' while in the case of '$\alpha_i$'≠'$\gamma_i$', 'PIX$_i$' is set to 'PIX$_i$'=1−'MPS [CX$_i$]. FIGS. 20A to 20D show meaning of signal of '$\alpha$', '$\beta$', '$\gamma$', determination condition of 'PIX', discrimination condition of 'MPS', and 'ST' renewal condition at the time of decoding processing.

The operation of the probability transition table 603 and the 'A'-register operation part 602 is the same as the case of coding processing. Due to the above processing, operation of the 'A'-register concerning pixel 'PIX$_i$', probability state transition, and determination of 'PIX' are implemented. FIG. 21 shows timing of decoding processing of the present embodiment. The decoding processing is capable of being completed using 2 clocks, thus it becomes possible to process the decoding processing using pipeline processing in the same way as the coding processing.

According to the embodiment described above, renewal part of probability presumption information realized using device such as ROM and/or RAM until now can be realized using logical circuit. The logical circuit is applied to a coding device and/or a decoding device so that it is capable of being processed without delay to data inputted continuously in high speed. Further, the embodiment causes bit-width of definite code bit within the 'C'-register to be equalized with bit-width of bit for operation, namely bit-width of 'LSZ' which is area-width of inferior symbol so as to cause the number of times of maximum code output in 1 time of processing to be 1 time, thus processing is capable of being performed smoothly to data inputted continuously.

As above, image decoding concerning the present invention is described. The integers 'h', 'y' 'K', of respective variables are changeable voluntarily within the conditions. Further, the above-described embodiment is one example of one preferred embodiment of the present invention. However, the invention is not restricted by the embodiment, it is capable of being implemented various kinds of modified embodiment which is not departed from the scope of gist of the present invention. For instance, the 'ST' renewal part and the 'MPS' renewal part are constituted by flip-flop in the embodiment, however, they are capable of being constituted by latch-gate and so forth.

As is clear from the above description, the image signal processing device of the present invention realizes accumulation of the status data for probability transition and the probability transition table using the logical circuit. For that reason, high-speed cycle of read and write of above-described probability presumption information is implemented, with the result that processing speed of the whole coding processing is improved.

Further, with respect to bit-width of the 'C'-register for generating code, the image signal processing device causes bit-width of bit of 'LSZ' to be equalized with bit-width of bit of definite code so that the maximum number of times of code output in coding of 1 pixel becomes 1 time. Furthermore, the image signal processing device employs the sum of shift quantity calculated in the 'A'-register operation part and 'CT' value representing code accumulated status of the definite code bit of the 'C'-register as a signal for detecting code status at the time of code output from the 'C'-register. Due to this matter, it becomes possible to perform code output smoothly from the definite bit-position without enlarging bit-width of the 'C'-register excessively.

As described above, when the present invention is used, it becomes to implement coding processing without delay to the pixel inputted continuously, thus high speed coding processing with constant speed is capable of being realized. Further, similarly, also concerning the decoding, since it is capable of outputting image without delay while implementing decoding processing continuously, it becomes possible to realize high speed decoding processing with constant speed.

While preferred embodiments of the invention have been described using specific terms, such description is for illustrative purpose only, and it is to be understood that changes and variations may be made without departing from the spirit or scope of the following claims.

What is claimed is:

1. An image signal processing device provided with a probability presumption information processing circuit, comprising:

a transition state renewal part for implementing maintenance/renewal of a status ('ST') value corresponding to respective contexts ('CX') and a more probability symbol ('MPS') value of said 'CX';

an 'A'-register operation part for implementing subtraction between value of an 'A'-register and occurrence probability ('LSZ') of a less probability symbol ('LPS') value, or shift of said 'A'-register;

a probability transition table for outputting corresponding said 'LSZ', next objective of transition ('NMPS') when coding candidate pixel value ('PIX') is said 'MPS', next objective of transition ('NLPS') when said 'PIX' is said 'LPS', and value of occurrence of inversion of said 'MPS' value ('SWTCH'), in answer to value of inputted said 'ST';

a flip-flop for adjusting timing of data;

a 'C'-register operation part for implementing addition/subtraction between said 'C'-register and said 'A'-register and/or shift of said 'C'-register; and a 'CT' renewal part for generating timing of input/output of signal, wherein said probability presumption information processing circuit further comprises an 'A'/'C' comparator for implementing comparison of value of said 'A'-register with value within bit for operation in said 'C'-register, before determining whether said 'PIX' is said 'MPS' or said 'LPS'.

2. An image signal processing device as claimed in claim 1, wherein said probability presumption information processing circuit is capable of being applied to coding processing and/or decoding processing.

3. An image signal processing device provided with a probability presumption information processing circuit, comprising:

a transition state renewal part for implementing maintenance/renewal of a status ('ST') value corresponding to respective contexts ('CX') and a more probability symbol ('MPS') value of said 'CX';

an 'A'-register operation part for implementing subtraction between value of an 'A'-register and occurrence probability ('LSZ') of a less probability symbol ('LPS') value, or shift of said 'A'-register;

a probability transition table for outputting corresponding said 'LSZ', next objective of transition ('NMPS') when coding candidate pixel value ('PIX') is said 'MPS', next objective of transition ('NLPS') when said 'PIX' is said 'LPS', and value of occurrence of inversion of said 'MPS' value ('SWTCH'), in answer to value of inputted said 'ST';

a flip-flop for adjusting timing of data;

a 'C'-register operation part for implementing addition/subtraction between said 'C'-register and said 'A'-register and/or shift of said 'C'-register; and a 'CT' renewal part for generating timing of input/output of signal, wherein said transition state renewal part comprises:

a 'CX' decode circuit for implementing decode of 'CX' value;

an 'MPS' inversion circuit for implementing inversion of 'MPS' in accordance with value of 'SWTCH';

an 'ST' renewal circuit for implementing output of 'ST[CX]' corresponding to said 'CX' inputted therein, and renewal of transition state of corresponding 'CX' for coding of next pixel; and an 'MPS' renewal circuit for implementing output of 'MPS[CX]' corresponding to 'CX' inputted therein and renewal of 'MPS' value of corresponding 'CX' for coding of next pixel.

4. An image signal processing device as claimed in claim 3, wherein said probability presumption information processing circuit is capable of being applied to coding processing and/or decoding processing.

5. An image signal processing device provided with a probability presumption information processing circuit, comprising:

a transition state renewal part for implementing maintenance/renewal of a status ('ST') value corresponding to respective contexts ('CX') and a more probability symbol ('MPS') value of said 'CX';

an 'A'-register operation part for implementing subtraction between value of an 'A'-register and occurrence probability ('LSZ') of a less probability symbol ('LPS') value, or shift of said 'A'-register;

a probability transition table for outputting corresponding said 'LSZ', next objective of transition ('NMPS') when coding candidate pixel value ('PIX') is said 'MPS', next objective of transition ('NLPS') when said 'PIX' is said 'LPS', and value of occurrence of inversion of said 'MPS' value ('SWTCH'), in answer to value of inputted said 'ST';

a flip-flop for adjusting timing of data;

a 'C'-register operation part for implementing addition/subtraction between said 'C'-register and said 'A'-register and/or shift of said 'C'-register; and a 'CT' renewal part for generating timing of input/output of signal, wherein said transition state renewal part comprises:
  a 'CX' decode circuit for implementing decode of 'CX' value;
  an 'MPS' inversion circuit for implementing inversion of 'MPS' in answer to value of 'SWTCH';
  a 'PIX' determination circuit for calculating pixel which is result of decoding;
  an 'ST' renewal circuit for implementing output of 'ST' value of 'ST[CX]' corresponding to 'CX' and renewal of state of corresponding 'CX' for coding of next pixel;
  an 'MPS' renewal circuit for implementing output of 'MPS' value of 'MPS[CX]' corresponding to 'CX' and renewal of 'MPS' value of corresponding 'CX' for coding of next pixel; and
  an exclusive NOR for configuring condition of 'PIX'-determination, 'MPS'-inversion, and state transition.

6. An image signal processing device as claimed in claim 5, wherein said probability presumption information processing circuit is capable of being applied to coding processing and/or decoding processing.

7. An image signal processing device as claimed in claim 6 further comprises a code extraction part including a shift circuit for extracting code from said 'C'-register in accordance with 'CT' outputted from said 'CT' renewal part.

8. An image signal processing device provided with a probability presumption information processing circuit, comprising:
  a transition state renewal part for implementing maintenance/renewal of a status ('ST') value corresponding to respective contexts ('CX') and a more probability symbol ('MPS') value of said 'CX';
  an 'A'-register operation part for implementing subtraction between value of an 'A'-register and occurrence probability ('LSZ') of a less probability symbol ('LPS') value, or shift of said 'A'-register;
  a probability transition table for outputting corresponding said 'LSZ', next objective of transition ('NMPS') when coding candidate pixel value ('PIX') is said 'MPS', next objective of transition ('NLPS') when said 'PIX' is said 'LPS', and value of occurrence of inversion of said 'MPS' value ('SWTCH'), in answer to value of inputted said 'ST';
  a flip-flop for adjusting timing of data;
  a 'C'-register operation part for implementing addition/subtraction between said 'C'-register and said 'A'-register and/or shift of said 'C'-register; and
  a 'CT' renewal part for generating timing of input/output of signal,
  wherein said 'A'-register operation part comprises:
    a flip-flop for implementing maintenance/renewal of value of 'A'-register;
    an 'A'-register subtraction control part for implementing control of subtraction of said 'A'-register;
    an 'A'-register comparison circuit for implementing comparison of value of 'A'—'LSZ' with value of 'LSZ';
    a shift quantity determination part for calculating shift quantity from value of said 'A'-register inputted therein; and
    a shift circuit for implementing shift of said 'A'-register in accordance with shift quantity outputted from said shift quantity determination part.

9. An image signal processing device as claimed in claim 8, wherein said probability presumption information processing circuit is capable of being applied to coding processing and/or decoding processing.

10. An image signal processing device provided with a probability presumption information processing circuit, comprising:
  a transition state renewal part for implementing maintenance/renewal of a status ('ST') value corresponding to respective contexts ('CX') and a more probability symbol ('MPS') value of said 'CX';
  an 'A'-register operation part for implementing subtraction between value of an 'A'-register and occurrence probability ('LSZ') of a less probability symbol ('LPS') value, or shift of said 'A'-register;
  a probability transition table for outputting corresponding said 'LSZ', next objective of transition ('NMPS') when coding candidate pixel value ('PIX') is said 'MPS', next objective of transition ('NLPS') when said 'PIX' is said 'LPS', and value of occurrence of inversion of said 'MPS' value ('SWTCH'), in answer to value of inputted said 'ST';
  a flip-flop for adjusting timing of data;
  a 'C'-register operation part for implementing addition/subtraction between said 'C'-register and said 'A'-register and/or shift of said 'C'-register; and
  a 'CT' renewal part for generating timing of input/output of signal,
  wherein said probability transition table comprises:
    an 'LSZ' selector for outputting value of 'LSZ' corresponding to 'ST' value inputted therein;
    an 'NMPS' selector for outputting value of 'NMPS' corresponding to 'ST' value inputted therein;
    an 'NLPS' selector for outputting value of 'NLPS' corresponding to 'ST' value inputted therein; and
    an 'SWTCH' selector for outputting value of 'SWTCH' corresponding to 'ST' value inputted therein.

11. An image signal processing device as claimed in claim 10, wherein said probability presumption information processing circuit is capable of being applied to coding processing and/or decoding processing.

12. An image signal processing device provided with a probability presumption information processing circuit, comprising:
  a transition state renewal part for implementing maintenance/renewal of a status ('ST') value corresponding to respective contexts ('CX') and a more probability symbol ('MPS') value of said 'CX';
  an 'A'-register operation part for implementing subtraction between value of an 'A'-register and occurrence probability ('LSZ') of a less probability symbol ('LPS') value, or shift of said 'A'-register;
  a probability transition table for outputting corresponding said 'LSZ', next objective of transition ('NMPS') when coding candidate pixel value ('PIX') is said 'MPS', next objective of transition ('NLPS') when said 'PIX' is said 'LPS', and value of occurrence of inversion of said 'MPS' value ('SWTCH'), in answer to value of inputted said 'ST';

a flip-flop for adjusting timing of data;

a 'C'-register operation part for implementing addition/subtraction between said 'C'-register and said 'A'-register and/or shift of said 'C'-register; and a 'CT' renewal part for generating timing of input/output of signal, wherein said 'C'-register operation part comprises:
- a flip-flop for implementing maintenance/renewal of value of said 'C'-register;
- an adder for implementing addition of value of said 'C'-register and value of said 'A'-register;
- a selector for selecting whether it causes output of said adder to be used or it causes of said flip-flop to be used directly as value of said 'C'-register;
- an exclusive OR for generating control signal of said selector;
- a shift circuit for implementing shift of said 'C'-register in accordance with shift quantity calculated by said 'A'-register operation circuit; and
- a mask circuit for implementing "0"-clear of bit corresponding code-part outputted when code-output is generated.

13. An image signal processing device as claimed in claim 12, wherein said probability presumption information processing circuit is capable of being applied to coding processing and/or decoding processing.

14. An image signal processing device provided with a probability presumption information processing circuit, comprising:

a transition state renewal part for implementing maintenance/renewal of a status ('ST') value corresponding to respective contexts ('CX') and a more probability symbol ('MPS') value of said 'CX';

an 'A'-register operation part for implementing subtraction between value of an 'A'-register and occurrence probability ('LSZ') of a less probability symbol ('LPS') value, or shift of said 'A'-register;

a probability transition table for outputting corresponding said 'LSZ', next objective of transition ('NMPS') when coding candidate pixel value ('PIX') is said 'MPS', next objective of transition ('NLPS') when said 'PIX' is said 'LPS', and value of occurrence of inversion of said 'MPS' value ('SWTCH'), in answer to value of inputted said 'ST';

a flip-flop for adjusting timing of data;

a 'C'-register operation part for implementing addition/subtraction between said 'C'-register and said 'A'-register and/or shift of said 'C'-register; and a 'CT' renewal part for generating timing of input/output of signal, wherein said 'CT' renewal part comprises:
- an adder for implementing addition of shift quantity calculated in the 'A'-register operation part and 'CT value outputted from said flip-flop;
- a flip-flop for implementing maintenance of 'CT value; and
- a flip-flop for implementing adjustment of timing of output signal of said adder.

15. An image signal processing device as claimed in claim 14, wherein said probability presumption information processing circuit is capable of being applied to coding processing and/or decoding processing.

* * * * *